(12) United States Patent
Kucera et al.

(10) Patent No.: US 11,096,109 B2
(45) Date of Patent: Aug. 17, 2021

(54) METHODS AND NETWORK ELEMENTS FOR MULTI-CONNECTIVITY CONTROL

(71) Applicants: ALCATEL-LUCENT USA INC., Murray Hill, NJ (US); ALCATEL-LUCENT CANADA INC., Ontario (CA); ALCATEL-LUCENT IRELAND LTD., Dublin (IE)

(72) Inventors: Stepan Kucera, Dublin (IE); Kariem Fahmi, Dublin (IE); Kamakshi Sridhar, Plano, TX (US); Jonathan Segel, Ottawa (CA)

(73) Assignee: Alcatel Lucent S.A.S., Nozay (FR)

( * ) Notice: Subject to any disclaimer, the term of this patent is extended or adjusted under 35 U.S.C. 154(b) by 48 days.

(21) Appl. No.: 16/487,910

(22) PCT Filed: Feb. 22, 2018

(86) PCT No.: PCT/US2018/019097
§ 371 (c)(1),
(2) Date: Aug. 22, 2019

(87) PCT Pub. No.: WO2018/156681
PCT Pub. Date: Aug. 30, 2018

(65) Prior Publication Data
US 2019/0387451 A1 Dec. 19, 2019

Related U.S. Application Data

(60) Provisional application No. 62/463,174, filed on Feb. 24, 2017.

(51) Int. Cl.
*H04W 40/10* (2009.01)
*H04W 28/22* (2009.01)
(Continued)

(52) U.S. Cl.
CPC .......... *H04W 40/10* (2013.01); *H04W 28/22* (2013.01); *H04W 40/12* (2013.01); *H04W 72/1273* (2013.01); *H04W 88/06* (2013.01)

(58) Field of Classification Search
CPC ..... H04W 28/22; H04W 40/10; H04W 40/12; H04W 72/1273; H04W 88/06;
(Continued)

(56) References Cited

U.S. PATENT DOCUMENTS 8,442,504 B2 * 5/2013 Souissi ................. H04L 25/14
455/414.2
9,402,247 B2 * 7/2016 Bala ........................ H04L 5/001
(Continued)

FOREIGN PATENT DOCUMENTS

EP    3297322 A1    3/2018
WO   2015/199340 A1   12/2015

OTHER PUBLICATIONS

International Search Report and Written Opinion received for corresponding Patent Cooperation Treaty Application No. PCT/US2018/019097, dated Aug. 13, 2018, 25 pages.
(Continued)

*Primary Examiner* — Thomas R Cairns
(74) *Attorney, Agent, or Firm* — Harrington & Smith

(57) ABSTRACT

In one example embodiment, a first network element includes a memory storing computer-readable instructions and at least one processor configured to execute the computer-readable instructions to cause the first network element to, obtain user equipment (UE)-side parameter values from a user domain of the UE, convert a first data stream received from a second network element into multiple second data streams over multiple data communication paths between the UE and the first network element and allocate the multiple second data streams to at least one of the
(Continued)

multiple data communication paths based on the UE-side parameter values.

21 Claims, 16 Drawing Sheets

(51) Int. Cl.
*H04W 40/12* (2009.01)
*H04W 72/12* (2009.01)
*H04W 88/06* (2009.01)

(58) Field of Classification Search
CPC ......... H04W 8/20; H04W 8/24; H04W 8/245; H04W 40/125–16; H04W 48/18; H04W 48/20; H04W 52/02; H04W 60/06; H04W 74/002; H04W 74/02; H04W 76/28; H04B 1/406; H04L 12/14; H04L 12/5691; H04L 29/08981; H04L 45/24; H04L 45/245; H04L 47/125; H04L 47/726; H04L 47/728; H04L 63/18; H04L 65/1003; H04L 65/1023; H04L 65/1026–103; H04L 65/1066; H04L 65/1069; H04L 65/1083; H04L 65/605; H04L 67/14; H04L 67/16; H04L 69/14; H04L 69/24; H04M 1/72406; Y02D 30/50; Y02D 30/70

See application file for complete search history.

(56) References Cited

U.S. PATENT DOCUMENTS

2012/0324100 A1* 12/2012 Tomici .............. H04W 28/0268
 709/224
2019/0082348 A1* 3/2019 Kim ..................... H04W 28/10

OTHER PUBLICATIONS

Kanugovi et al., "Multiple Access Management Services draft-kanugovi-intarea-mams-protocol-02", IETF, Intarea Internet-Draft, Jan. 20, 2017, pp. 1-15.

Deng et al., "Use-cases and Requirements for MPTCP Proxy in ISP Networks draft-deng-mptcp-proxy-00", IETF, MPTCP Working Group Internet-Draft, May 29, 2014, 19 pages.

* cited by examiner

METHODS AND NETWORK ELEMENTS FOR MULTI-CONNECTIVITY CONTROL

RELATED APPLICATION

This application was originally filed as Patent Cooperation Treaty Application No. PCT/US2018/019097 filed Feb. 22, 2018, which claims priority benefit to U.S. Provisional Patent Application No. 62/463,174, filed Feb. 24, 2017.

BACKGROUND

In multi-path (MP) wireless communications, multiple radio access technologies (RAT) are used simultaneously to deliver a single data flow over multiple parallel wireless links (paths).

SUMMARY

In at least one example embodiment, a first network element includes a memory storing computer-readable instructions and at least one processor configured to execute the computer-readable instructions to cause the first network element to, obtain user equipment (UE)-side parameter values from a user domain of a UE, convert a first data stream received from a second network element into multiple second data streams over multiple data communication paths between the UE and the first network element and allocate the multiple second data streams to at least one of the multiple data communication paths based on the UE-side parameter values.

In at least one example embodiment, the at least one processor is configured to execute the computer-readable instructions to cause the first network element to obtain the UE-side parameter values using control messages in a shared bandwidth as data payload.

In at least one example embodiment, the at least one processor is configured to execute the computer-readable instructions to cause the first network element to obtain the UE-side parameter values one of a User Datagram Protocol (UDP) and Transmission Control Protocol (TCP) connection.

In at least one example embodiment, the UE-side parameter values include power-related information of the UE and the at least one processor is configured to execute the computer-readable instructions to cause the first network element to allocate the multiple second data streams to the at least one of the multiple data communication paths based on the power-related information.

In at least one example embodiment, the at least one processor is configured to execute the computer-readable instructions to cause the first network element to allocate the multiple second data streams by changing a configuration of another one of the multiple data communication paths if the power-related information of the UE is below a threshold level.

In at least one example embodiment, the at least one processor is configured to execute the computer-readable instructions to cause the first network element to allocate the multiple second data streams to the at least one of the multiple data communication paths further based on at least one of a transport protocol, an application and a Quality of Service (QoS) class, the transport protocol being one of at least a first protocol and a second protocol, and the at least one processor is configured to allocate the multiple second data streams differently for the first and second protocols.

In at least one example embodiment, the at least one processor is configured to execute the computer-readable instructions to cause the first network element to allocate the multiple second data streams by changing a configuration of another one of the multiple data communication paths based on the UE-side parameter values.

In at least one example embodiment, the UE-side parameter values include at least one of power-related information, achievable data rate, congestion related information and delay related information.

In at least one example embodiment, the at least one processor is configured to execute the computer-readable instructions to cause the first network element to select a scheduler based on the allocating the multiple second data streams to at least one of the multiple data communication paths.

In at least one example embodiment, the at least one processor is configured to execute the computer-readable instructions to cause the first network element to control a Transmission Control Protocol (TCP) congestion window parameter value for the at least one of the multiple data communication paths in a user domain and send the TCP congestion window parameter value to a network control domain of the first network element to limit a downlink transmission rate.

In at least one example embodiment, the at least one processor is configured to execute the computer-readable instructions to cause the first network element to establish a connection with a user space module in the UE and receive data from the UE using one of a User Datagram Protocol (UDP) and Transmission Control Protocol (TCP) connection based on the connection with the user space module.

In at least one example embodiment, a user equipment (UE) is configured to receive and transmit data over communication paths of different bands and includes a memory storing computer-readable instructions and at least one processor configured to execute the computer-readable instructions to cause the UE to operate in a network control domain and a user domain, obtain UE-side parameter values from the network control domain, the UE-side parameter values being specific to a user application in the user domain, the UE-side parameter values being at least one of values determined by the UE and values known by the UE, provide the UE-side parameter values to a network proxy from the user domain, and receive data in the network control domain based on the UE-side parameter values.

In at least one example embodiment, the UE-side parameter values include at least one of power-related information, achievable data rate, congestion related information and delay related information.

In at least one example embodiment, the at least one processor is configured to execute the computer-readable instructions to cause the UE to provide the UE-side parameter values using control messages in a shared bandwidth as data payload.

In at least one example embodiment, the at least one processor is configured to execute the computer-readable instructions to cause the UE to provide the UE-side parameter values using one of a User Datagram Protocol (UDP) and Transmission Control Protocol (TCP) connection.

In at least one example embodiment, a non-transitory computer-readable medium, when executed by at least one processor, is configured to cause the at least one processor to cause a user equipment (UE) to operate in a network control domain of the UE and a user domain of the UE, obtain UE-side parameter values from the network control domain, the UE-side parameter values being specific to a user application in the user domain, the UE-side parameter values being at least one of values determined by the UE and values known by the UE and provide the UE-side parameter values to a network proxy from the user domain based on a transport protocol.

In at least one example embodiment, a first network element includes a memory storing computer-readable instructions and at least one processor configured to execute the computer-readable instructions to cause the first network element to convert a first data stream received from a second network element into multiple second data streams over multiple data communication paths between the first network element and a user equipment (UE), control a Transmission Control Protocol (TCP) congestion window parameter value for the multiple data communication paths in a user domain, send the TCP window parameter value to a network control domain of the first network element to limit a transmission rate of the multiple data communication paths and allocate the multiple second data streams to at least one of the multiple data communication paths based on the limited transmission rate.

In at least one example embodiment, the TCP window parameter value is a TCP congestion window parameter value and the at least one processor is configured to execute the computer-readable instructions to cause the first network element to limit a downlink transmission rate of the multiple data communication paths using the TCP congestion window parameter value, the limited downlink transmission rate being the limited transmission rate and allocate the multiple second data streams to at least one of the multiple data communication paths based on the limited downlink transmission rate.

In at least one example embodiment, the at least one processor is configured to execute the computer-readable instructions to cause the first network element to obtain UE-side parameter values from a user domain of the UE using control messages in a shared bandwidth as data payload, the UE-side parameter values being at least one of values determined by the UE and values known by the UE.

In at least one example embodiment, the UE-side parameter values include power-related information of the UE and the at least one processor is configured to execute the computer-readable instructions to cause the first network element to allocate the multiple second data streams to the at least one of the multiple data communication paths based on the power-related information.

In at least one example embodiment, the at least one processor is configured to execute the computer-readable instructions to cause the first network element to allocate the multiple second data streams by changing a configuration of another one of the multiple data communication paths if the power-related information of the UE is below a threshold level.

In at least one example embodiment, the at least one processor is configured to execute the computer-readable instructions to cause the first network element to allocate the multiple second data streams by changing a configuration of another one of the multiple data communication paths based on the UE-side parameter values.

In at least one example embodiment, the UE-side parameter values include at least one of power-related information, achievable data rate, congestion related information and delay related information.

In at least one example embodiment, the at least one processor is configured to execute the computer-readable instructions to cause the first network element to select a scheduler based on the allocating the multiple second data streams to at least one of the multiple data communication paths.

In at least one example embodiment, a non-transitory computer-readable medium, when executed by at least one processor in a first network element, is configured to cause the first network element to convert a first data stream received from a second network element into multiple second data streams over multiple data communication paths between the first network element and a user equipment (UE), control a Transmission Control Protocol (TCP) congestion window parameter value for the multiple data communication paths in a user domain, send the TCP window parameter value to a network control domain of the first network element to limit a transmission rate of the multiple data communication paths and allocate the multiple second data streams to at least one of the multiple data communication paths based on the limited transmission rate.

At least one example embodiment provides a first network element including a storing means storing computer-readable instructions; and a processing means configured to execute the computer-readable instructions to cause the first network element to obtain user equipment (UE)-side parameter values from a user domain of the UE, the UE-side parameter values being at least one of values determined by the UE and values known by the UE, convert a first data stream received from a second network element into multiple second data streams over multiple data communication paths between the first network element and the UE, and allocate the multiple second data streams to at least one of the multiple data communication paths based on the UE-side parameter values.

In at least one example embodiment, the processing means is configured to execute the computer-readable instructions to cause the first network element to obtain the UE-side parameter values using control messages in a shared bandwidth as data payload.

In at least one example embodiment, the processing means is configured to execute the computer-readable instructions to cause the first network element to obtain the UE-side parameter values using one of a User Datagram Protocol (UDP) and a Transmission Control Protocol (TCP) connection.

In at least one example embodiment, the UE-side parameter values include at least one of power-related information, achievable data rate, congestion related information and delay related information and the processing means is configured to execute the computer-readable instructions to cause the first network element to allocate the multiple second data streams to the at least one of the multiple data communication paths based on the at least one of the power-related information, achievable data rate, congestion related information and delay related information.

In at least one example embodiment, the processing means is configured to execute the computer-readable instructions to cause the first network element to allocate the multiple second data streams by changing a configuration of another one of the multiple data communication paths if the power-related information of the UE is below a threshold level.

In at least one example embodiment, the processing means is configured to execute the computer-readable instructions to cause the first network element to allocate the multiple second data streams to the at least one of the multiple data communication paths further based on at least one of transport protocol, an application and a Quality of Service (QoS) class, the transport protocol being one of at least a first protocol and a second protocol, and the processing means is configured to cause the first network element to allocate the multiple second data streams differently for the first and second protocols.

In at least one example embodiment, the processing means is configured to execute the computer-readable instructions to cause the first network element to select a scheduler based on the allocating the multiple second data streams to at least one of the multiple data communication paths.

In at least one example embodiment, the processing means is configured to execute the computer-readable instructions to cause the first network element to obtain a Transmission Control Protocol (TCP) congestion window parameter value for the at least one data communication paths, and send a first parameter value to a network control domain of the first network element to limit a downlink transmission rate if the TCP congestion window parameter value exceeds the first parameter value.

In at least one example embodiment, the processing means is configured to execute the computer-readable instructions to cause the first network element to obtain a TCP receive window parameter value for the multiple data communication paths in the first network element, and send a second parameter value to a network control domain of the UE to limit an uplink transmission rate if the TCP receive window parameter value exceeds the second parameter value.

In at least one example embodiment, the processing means is configured to execute the computer-readable instructions to cause the first network element to establish a connection with a user space module in the UE, and receive data from the UE using one of a User Datagram Protocol (UDP) and a Transmission Control Protocol (TCP) connection based on the connection with the user space module.

At least one example embodiment provides a user equipment (UE) configured to receive and transmit data over communication paths of different bands. The UE includes a means for storing computer-readable instructions and at least one processing means configured to execute the computer-readable instructions to cause the UE to operate in a network control domain and a user domain, obtain UE-side parameter values from the network control domain, the UE-side parameter values being specific to a user application in the user domain, the UE-side parameter values being at least one of values determined by the UE and values known by the UE, provide the UE-side parameter values to a network proxy from the user domain, and receive data in the network control domain based on the UE-side parameter values.

In at least one example embodiment, the UE-side parameter values include at least one of power-related information, achievable data rate, congestion related information and delay related information.

In at least one example embodiment, the processing means is configured to execute the computer-readable instructions to cause the UE to provide the UE-side parameter values using control messages in a shared bandwidth as data payload.

In at least one example embodiment, the processing means is configured to execute the computer-readable instructions to cause the UE to provide the UE-side parameter values one of a User Datagram Protocol (UDP) and Transmission Control Protocol (TCP) connection.

At least one example embodiment provides a non-transitory computer-readable medium, when executed by a processing means, configured to cause the processing means to operate in a network control domain of a user equipment (UE) and a user domain of the UE, obtain UE-side parameter values from the network control domain, the UE-side parameter values being specific to a user application in the user domain, the UE-side parameter values being at least one of values determined by the UE and values known by the UE, and provide the UE-side parameter values to a network proxy from the user domain based on a transport protocol.

At least one example embodiment provides a first network element comprising a storing means storing computer-readable instructions; and a processing means configured to execute the computer-readable instructions to cause the first network element to convert a first data stream received from a second network element into multiple second data streams over multiple data communication paths between the first network element and a user equipment (UE), obtain a Transmission Control Protocol (TCP) window parameter value for the multiple data communication paths in a user domain, send a first parameter value to a network control domain of the first network element to limit a transmission rate of the multiple data communication paths if the TCP window parameter value exceeds the first parameter value, and allocate the multiple second data streams to at least one of the multiple data communication paths based on the limited transmission rate.

In at least one example embodiment, the TCP window parameter value is a TCP congestion window parameter value and the processing means is configured to execute the computer-readable instructions to cause the first network element to limit a downlink transmission rate of the multiple data communication paths using the first parameter value, the limited downlink transmission rate being the limited transmission rate, and allocate the multiple second data streams to at least one of the multiple data communication paths based on the limited downlink transmission rate.

In at least one example embodiment, the processing means is configured to execute the computer-readable instructions to cause the first network element to obtain a TCP receive window parameter value for the multiple data communication paths, and send a second parameter value to a network control domain of the UE to limit an uplink transmission rate if the TCP receive window parameter value exceeds the second parameter value.

In at least one example embodiment, the processing means is configured to execute the computer-readable instructions to cause the first network element to obtain UE-side parameter values from a user domain of the UE using control messages in a shared bandwidth as data payload, the UE-side parameter values being at least one of values determined by the UE and values known by the UE.

In at least one example embodiment, the UE-side parameter values include at least one of power-related information, achievable data rate, congestion related information and delay related information and the processing means is configured to execute the computer-readable instructions to cause the first network element to allocate the multiple second data streams to the at least one of the multiple data communication paths based on the at least one of the power-related information, achievable data rate, congestion related information and delay related information.

In at least one example embodiment, the processing means is configured to execute the computer-readable instructions to cause the first network element to allocate the multiple second data streams by changing a configuration of another one of the multiple data communication paths if the power-related information of the UE is below a threshold level.

In at least one example embodiment, the processing means is configured to execute the computer-readable instructions to cause the first network element to allocate the multiple second data streams by changing a configuration of another one of the multiple data communication paths based on the UE-side parameter values.

In at least one example embodiment, the UE-side parameter values include at least one of power-related information, achievable data rate, congestion related information and delay related information.

In at least one example embodiment, the processing means is configured to execute the computer-readable instructions to cause the first network element to select a scheduler based on the allocating the multiple second data streams to at least one of the multiple data communication paths.

At least one example embodiment provides a non-transitory computer-readable medium, when executed by a processing means in a first network element, configured to cause the first network element to convert a first data stream received from a second network element into multiple second data streams over multiple data communication paths between the first network element and a user equipment (UE), obtain a Transmission Control Protocol (TCP) window parameter value for the multiple data communication paths in a user domain, send a first parameter value to a network control domain of the first network element to limit a transmission rate of the multiple data communication paths if the TCP window parameter value exceeds the first parameter value, and allocate the multiple second data streams to at least one of the multiple data communication paths based on the limited transmission rate.

At least one example embodiment provides a method including obtaining user equipment (UE)-side parameter values from a user domain of a UE, the UE-side parameter values being at least one of values determined by the UE and values known by the UE, the UE being configured to receive data from a first network element, converting a first data stream received from a second network element into multiple second data streams over multiple data communication paths between the first network element and the UE and allocating the multiple second data streams to at least one of the multiple data communication paths based on the UE-side parameter values.

In at least one example embodiment, the obtaining obtains the UE-side parameter values using control messages in a shared bandwidth as data payload.

In at least one example embodiment, the obtaining obtains the UE-side parameter values using one of a User Datagram Protocol (UDP) and a Transmission Control Protocol (TCP) connection.

In at least one example embodiment, the UE-side parameter values include at least one of power-related information, achievable data rate, congestion related information and delay related information and the allocating allocates the multiple second data streams to the at least one of the multiple data communication paths based on the at least one of the power-related information, achievable data rate, congestion related information and delay related information.

In at least one example embodiment, allocating includes changing a configuration of another one of the multiple data communication paths if the power-related information of the UE is below a threshold level.

In at least one example embodiment, the allocating allocates the multiple second data streams to the at least one of the multiple data communication paths further based on at least one of a transport protocol, an application and a Quality of Service (QoS) class, the transport protocol being one of at least a first protocol and a second protocol, and allocates the multiple second data streams differently for the first and second protocols.

In at least one example embodiment, the method further includes selecting a scheduler based on the allocating the multiple second data streams to at least one of the multiple data communication paths.

In at least one example embodiment, the method further includes obtaining a Transmission Control Protocol (TCP) congestion window parameter value for the at least one of the multiple data communication paths and sending a first parameter value to a network control domain of the first network element to limit a downlink transmission rate if the TCP congestion window parameter value exceeds the first parameter value.

In at least one example embodiment, the obtaining the TCP congestion window parameter value for the at least one of the multiple data communication paths obtains a TCP receive window parameter value for the multiple data communication paths in the first network element, and the method further includes sending a second parameter value to a network control domain of the UE to limit an uplink transmission rate if the TCP receive window parameter value exceeds the second parameter value.

In at least one example embodiment, the method further includes establishing a connection with a user space module in the UE and receiving data from the UE using one of a User Datagram Protocol (UDP) and a Transmission Control Protocol (TCP) connection based on the connection with the user space module.

At least one example embodiment provides a method including operating in a network control domain and a user domain, obtaining UE-side parameter values from the network control domain, the UE-side parameter values being specific to a user application in the user domain, the UE-side parameter values being at least one of values determined by a user equipment (UE) and values known by the UE, providing the UE-side parameter values to a network proxy from the user domain and receiving data in the network control domain based on the UE-side parameter values.

In at least one example embodiment, the UE-side parameter values include at least one of power-related information, achievable data rate, congestion related information and delay related information.

In at least one example embodiment, the providing provides the UE-side parameter values using control messages in a shared bandwidth as data payload.

In at least one example embodiment, the providing provides the UE-side parameter values using one of a User Datagram Protocol (UDP) and Transmission Control Protocol (TCP) connection.

At least one example embodiment provides a method including converting a first data stream into multiple second data streams over multiple data communication paths between a first network element and a user equipment (UE), obtaining a Transmission Control Protocol (TCP) window parameter value for the multiple data communication paths in a user domain, sending a first parameter value to a network control domain of the first network element to limit a transmission rate of the multiple data communication paths if the TCP window parameter value exceeds the first parameter value and allocating the multiple second data streams to at least one of the multiple data communication paths based on the limited transmission rate.

In at least one example embodiment, the TCP window parameter value is a TCP congestion window parameter value and the method further includes limiting a downlink transmission rate of the multiple data communication paths using the first parameter value, the limited downlink transmission rate being the limited transmission rate, wherein the allocating allocates the multiple second data streams to at least one of the multiple data communication paths based on the limited downlink transmission rate.

In at least one example embodiment, the limiting includes obtaining a TCP receive window parameter value for the multiple data communication paths and sending a second parameter value to a network control domain of the UE to limit an uplink transmission rate if the TCP receive window parameter value exceeds the second parameter value.

In at least one example embodiment, the method further includes obtaining UE-side parameter values from a user domain of the UE using control messages in a shared bandwidth as data payload, the UE-side parameter values being at least one of values determined by the UE and values known by the UE.

In at least one example embodiment, the UE-side parameter values include at least one of power-related information, achievable data rate, congestion related information and delay related information and the allocating allocates the multiple second data streams to the at least one of the multiple data communication paths based on the at least one of the power-related information, achievable data rate, congestion related information and delay related information.

In at least one example embodiment, the allocating includes changing a configuration of another one of the multiple data communication paths if the power-related information of the UE is below a threshold level.

In at least one example embodiment, the allocating includes changing a configuration of another one of the multiple data communication paths based on the UE-side parameter values.

In at least one example embodiment, the UE-side parameter values include at least one of power-related information, achievable data rate, congestion related information and delay related information.

In at least one example embodiment, the method further includes selecting a scheduler based on the allocating the multiple second data streams to at least one of the multiple data communication paths.

BRIEF DESCRIPTION OF THE DRAWINGS

Some example embodiments will be described with reference to the accompanying drawings. FIGS. 1-17 represent non-limiting, example embodiments as described herein.

FIG. 2 is a diagram illustrating an example structure of a network element according to an example embodiment.

FIG. 3 is a diagram illustrating an example structure of a user equipment (UE) according to an example embodiment.

FIG. 4 illustrates a multi-connectivity communication system according to an example embodiment.

FIG. 5 illustrates a multi-connectivity communication system according to an example embodiment.

FIG. 6 illustrates a multi-connectivity communication system according to an example embodiment.

FIG. 7 illustrates a multi-connectivity communication system according to an example embodiment.

FIG. 8 illustrates a multi-connectivity communication system according to an example embodiment.

FIG. 9 schematically shows a user equipment.

FIG. 10 schematically shows an architecture overview of a user equipment, intermediate proxy node and content server.

FIG. 11 schematically shows an example of the user equipment and intermediate node using legacy multi-path protocols.

FIG. 12 schematically shows a user equipment and intermediate node using a non-standardized protocol.

FIGS. 13 and 14 schematically illustrate the generation of error correction codes and the recovering of data therefrom.

FIG. 15 illustrates a method according to an example embodiment;

FIG. 16 illustrates a method according to an example embodiment; and

FIG. 17 illustrates a method according to an example embodiment.

DETAILED DESCRIPTION

Figures 1A, 1B:
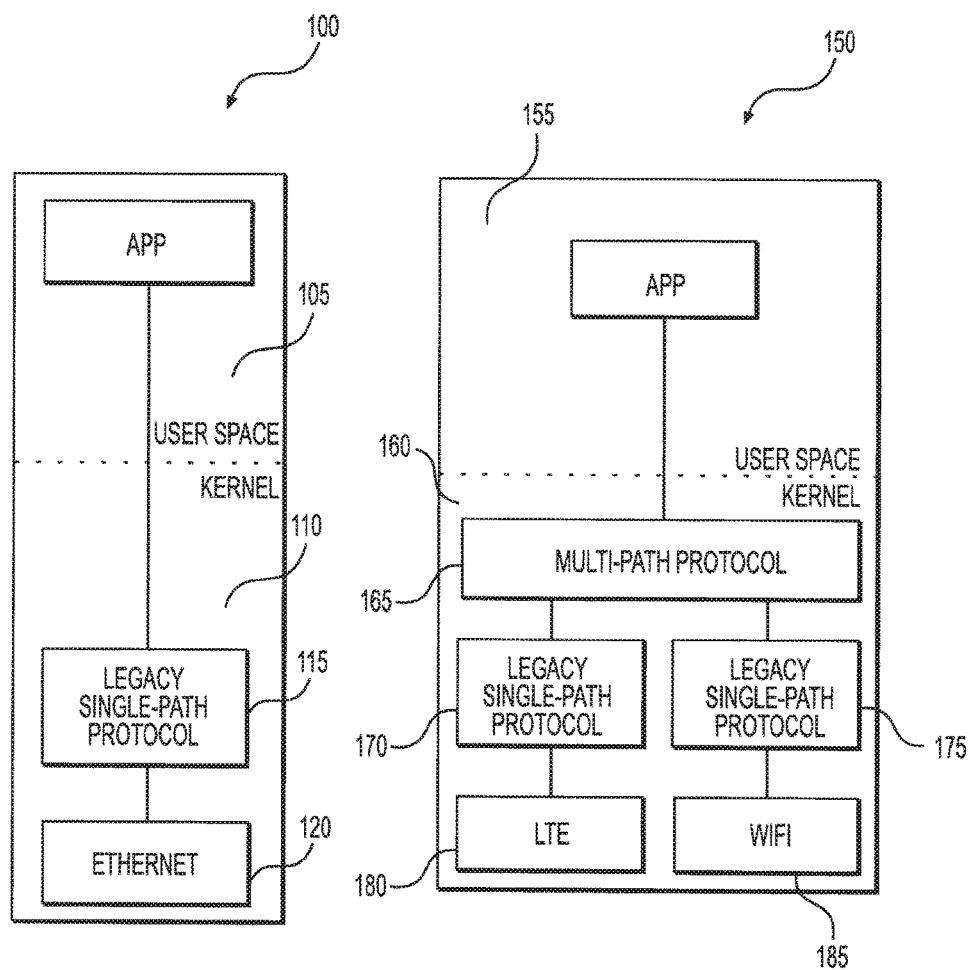
FIGS. 1A-1B illustrate communication systems according to conventional art.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), system on chip (SoC), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of storage medium. As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

While the term "base station" is used to describe a transceiver in communication with and providing wireless resources to users in a geographical coverage area, example embodiments are not limited to base stations and also include a NodeB, an evolved NodeB (eNB), transceiver station, base transceiver station (BTS), macro cell, etc.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network or a 5G network) and/or a WiFi network or wireless local area network (WLAN).

Example embodiments disclose a novel framework for flexible policy-driven control of multi-connectivity networking that implements control mechanisms such as dynamic link selection, traffic steering and load balancing.

Example embodiments may be deployed in unmodified (legacy) UEs and are backward-compatible with legacy applications. Example embodiments use UE-side parameters (parameters of the UE and network-measured parameters at the UE) such as link delay, signal strength, and base station load/congestion as decision-making inputs. For example, the UE-side parameters may include at least one of power-related information, achievable data rate, congestion related information and delay related information. Power-related information may include a battery level of the UE, a remaining charging time of the UE, a total received signal strength in given channel, a received signal strength from a serving base station, a received signal strength from one or more interfering base stations and a receiver signal to noise and/or interference ratio. Congestion related information may include a congestion window, a window scaling parameter, an advertised receive window, a radio access peak/advertised rate, a packet loss rate, a packet reordering and/or a packet inter-arrival time. Delay related information may include a round trip time (RTT), a forward delay, a propagation delay, a bandwidth delay and/or a queuing delay.

The UE-side parameters are not limited to a single network operator. Therefore, a UE may supply parameter values from all network operators to a single network element. For example, a UE may supply a received signal strength from WiFi of a first network operator and a received signal strength from LTE of a second network operator to the single network element.

FIG. 1A illustrates a conventional UE having a single-path networking protocol. As shown in FIG. 1A, a UE 100 includes a user domain (or in other words, user space) 105 and a kernel 110 (i.e., a network control domain). The kernel 110 includes a legacy single-path protocol stack 115 (e.g., TCP/IP) to communicate over an Ethernet interface 120.

In order for the UE 100 to support multi-technology multi-band networking, the UE 100 requires modifications of the kernel 110 in order to deploy multi-path communications, as this is where the networking protocol stack 115 is located. Kernel modifications are difficult to implement and are limited by sensitive kernel dependencies as well as stability and code pollution issues.

More importantly, however, kernel modifications often imply the need for UE unlocking and/or super-user access. This is a commercially unviable option as UE unlocking typically voids a UE warranty, while establishing super-user access has security and privacy implications. Network operators willing to tackle such issues have to develop and maintain software patches and kernel builds for all existing phones versions and their proprietary drivers, resulting in increased costs.

FIG. 1B illustrates a conventional UE having a multi-path networking protocol. As shown in FIG. 1B, a UE 150 includes a user domain 155 and a kernel 160 (i.e., a network control domain). The kernel 160 includes a multi-path protocol 165 that controls two legacy single-path protocol stacks 170, 175 (e.g., UDP or TCP/IP). The two legacy single-path protocol stacks 170, 175 are used to communicate over an LTE interface 180 and a WiFi interface 185, respectively.

In order for the UE 150 to support multi-technology multi-band networking, the UE 150 requires modifications of the kernel 160 in order to deploy multi-path communications, as this is where the single-path protocol stacks 170 and 175 are located.

Examples of kernel modifications for multi-connectivity deployment include re-configuration of routing tables together with the creation and management of Internet Protocol Security (IPSec) tunnels (network-layer multi-connectivity such as lightweight IP (LWIP) and LTE WLAN aggregation (LWA)) or the replacement of the entire transport layer of the networking stack (transport-layer solutions based on Multi-Path Transport Control Protocol (MPTCP)). Other multi-path protocols like Stream Control Transmission Protocol (SCTP), an advanced Internet Engineering Task Force (IETF) standard for multi-path communications using a new API, would additionally require adaptation as operators and application authors use a new backward-incompatible application programming interface (API).

From the control-plane perspective, kernel-based multi-connectivity can be conventionally controlled for load balancing and traffic steering purposes by using a dedicated application programming interface (API). However, these APIs may be limited in scope as many legacy applications are incompatible with any future API which may have a detrimental effect on adoption by network operators.

Figure 2:
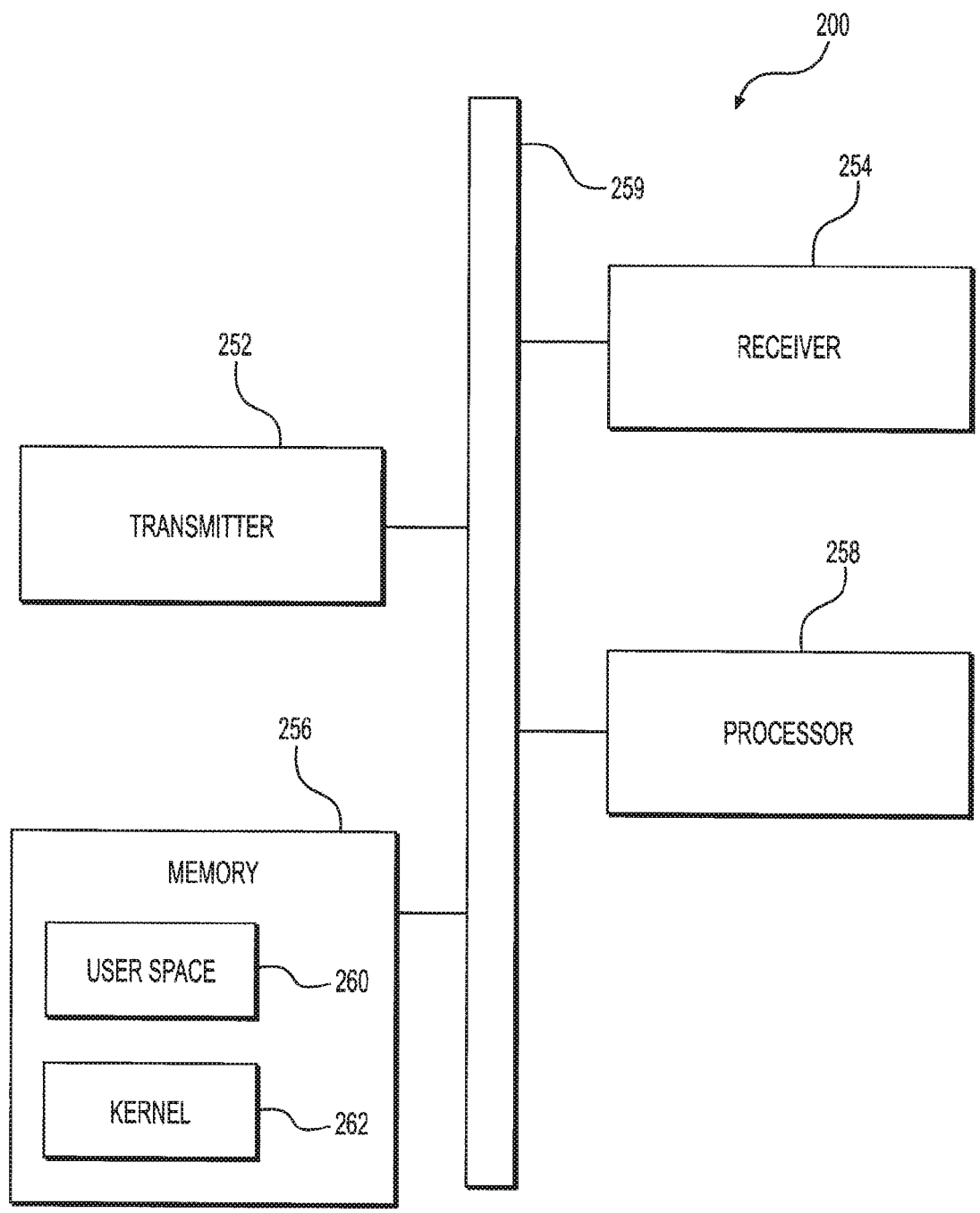

FIG. 2 is a diagram illustrating an example structure of a network element 200. Referring to FIG. 2, the network element 200 may include, for example, a data bus 259, a transmitter 252, a receiver 254, a memory 256, and a processor 258.

The transmitter 252, receiver 254, memory 256, and processor 258 may send data to and/or receive data from one another using the data bus 259. While the transmitter 252 and the receiver 254 are illustrated as separate entities, it should be understood that the transmitter 252 and the receiver 254 may be combined to form a transceiver.

The transmitter 252 is a device that includes hardware and any necessary software for transmitting signals including, for example, control signals or data signals via one or more wired and/or wireless connections to other network element.

The receiver 254 is a device that includes hardware and any necessary software for receiving wireless signals including, for example, control signals or data signals via one or more wired and/or wireless connections to other network elements.

The memory 256 may be any device capable of storing data including magnetic storage, flash storage, etc.

The processor 258 may be any device capable of processing data including, for example, a processor structurally configured to carry out specific operations, or structurally configured to execute instructions included in computer readable code including, for example, code stored in the memory 256. Examples of the above-referenced processor include, but are not limited to, a microprocessor, a multi-processor, a central processing unit (CPU), a digital signal processor (DSP), system-on-chip (SoC) devices, an application-specific integrated circuit (ASIC), and a field programmable gate array (FPGA).

According to at least one example embodiment, any operations described herein as being performed by a network proxy, may be performed by the network element 200 shown in FIG. 2. For example, according to at least one example embodiment, the network element 200 may be programmed, in terms of software and/or hardware, to perform any or all of the functions described herein as being performed by a network element.

Examples of the network element 200 being programmed, in terms of software, to perform any or all of the functions described herein will now be discussed below. For example, the memory 256 may store a program including executable instructions corresponding to any or all of the operations described herein. According to at least one example embodiment, additionally or alternatively to being stored in the memory 256, the executable instructions may be stored in a computer-readable medium including, for example, an optical disc, flash drive, SD card, etc., and the network element 200 may include hardware for reading data stored on the computer readable-medium. Further, the processor 258 may be a processor configured to perform any or all of the operations described herein by reading and executing the executable instructions stored in at least one of the memory 256 and a computer readable storage medium loaded into hardware included in the network element 200 for reading computer-readable mediums.

Examples of the network element 200 being programmed, in terms of hardware, to perform any or all of the functions described herein will now be discussed below. Additionally or alternatively to executable instructions corresponding to the functions described as being performed by the network element 200 being stored in a memory or a computer-readable medium as is discussed above, the processor 258 may include a circuit that has a structural design dedicated to performing any or all of the operations described herein. For example, the above-referenced circuit included in the processor 258 may be a FPGA or ASIC physically programmed to perform any or all of the operations described herein.

The memory 256 may store computer-readable instructions 260 for operating in a user domain (or in other words, user space) and instructions 262 for operating a kernel (network control domain) of the network element 200.

In one example embodiment, the processor 258 executes instructions stored in the memory 256 to operate in the user domain and the network control domain. The processor 258 executes instructions stored in the memory 256 to obtain user equipment (UE)-side parameter values from a user domain of the UE, convert a first data stream received from a second network element into multiple second data streams over multiple data communication paths between the UE and the network element 200, and allocate the multiple second data streams to at least one of the multiple data communication paths based on the UE-side parameter values.

In an example embodiment, the processor 258 executes instructions stored in the memory 256 to convert a first data stream received from a second network element into multiple second data streams over multiple data communication paths between a user equipment (UE) and the first network element, obtain a Transmission Control Protocol (TCP)

window parameter value for the multiple data communication paths, send a first parameter value to a network control domain of the network element 200 to limit a transmission rate of the multiple data communication paths if the TCP window parameter value exceeds the first parameter value, and allocate the multiple second data streams to at least one of the multiple data communication paths based on the limited transmission rate.

Figure 3:
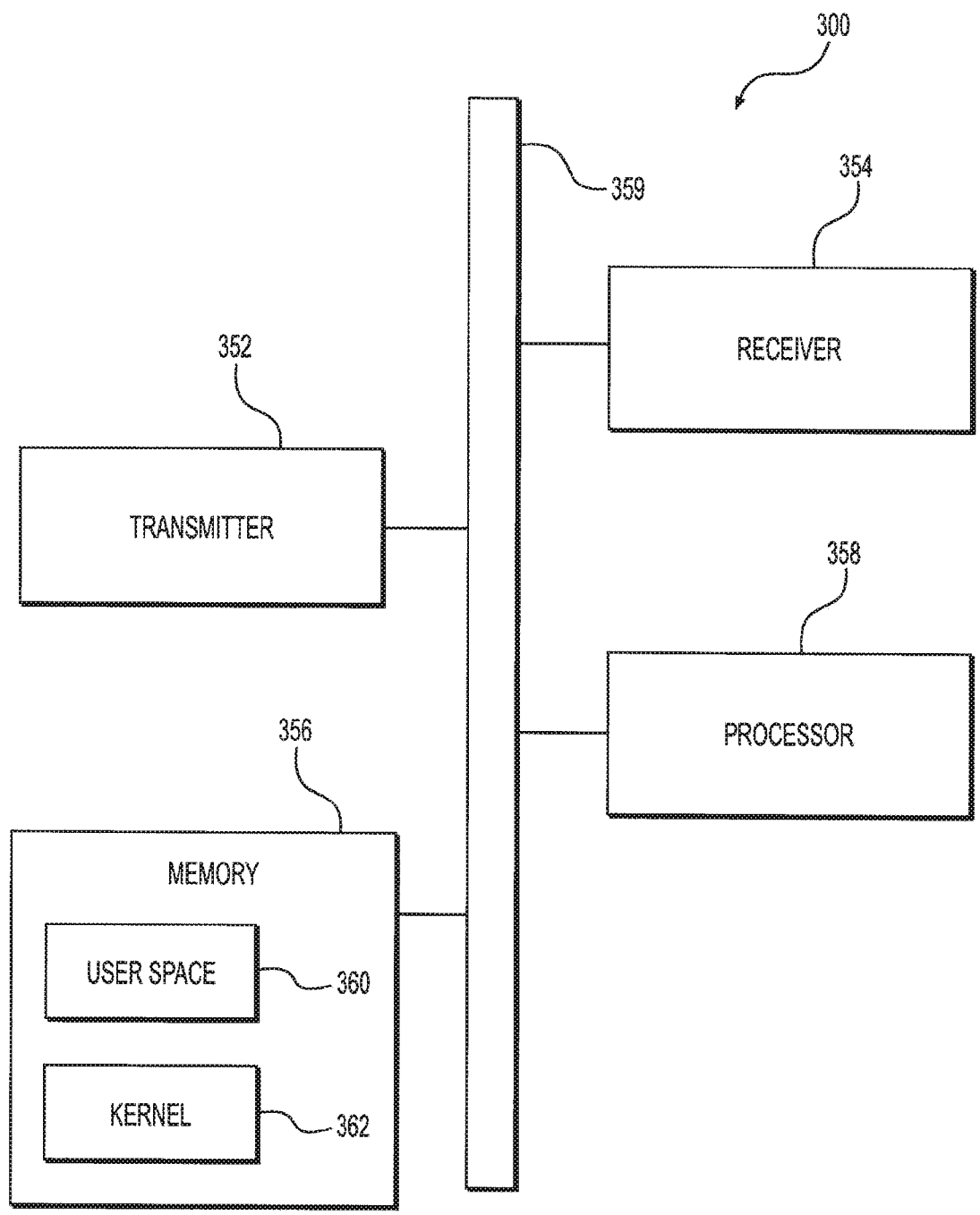

FIG. 3 is a diagram illustrating an example structure of a UE 300. Referring to FIG. 3, the UE 300 may include, for example, a data bus 359, a transmitter 352, a receiver 354, a memory 356, and a processor 358.

The transmitter 352, receiver 354, memory 356, and processor 358 may send data to and/or receive data from one another using the data bus 359. While the transmitter 352 and the receiver 354 are illustrated as separate entities, it should be understood that the transmitter 352 and the receiver 354 may be combined to form a transceiver.

The transmitter 352 is a device that includes hardware and any necessary software for transmitting signals including, for example, control signals or data signals via one or more wired and/or wireless connections to other network element.

The receiver 354 is a device that includes hardware and any necessary software for receiving wireless signals including, for example, control signals or data signals via one or more wired and/or wireless connections to other network elements.

The memory 356 may be any device capable of storing data including magnetic storage, flash storage, etc.

The processor 358 may be any device capable of processing data including, for example, a processor structurally configured to carry out specific operations, or structurally configured to execute instructions included in computer readable code including, for example, code stored in the memory 356. Examples of the above-referenced processor include, but are not limited to, a microprocessor, a multi-processor, a central processing unit (CPU), a digital signal processor (DSP), system-on-chip (SoC) devices, an application-specific integrated circuit (ASIC), and a field programmable gate array (FPGA).

According to at least one example embodiment, any operations described herein as being performed by a UE, may be performed by the UE 300 shown in FIG. 3. For example, according to at least one example embodiment, the UE 300 may be programmed, in terms of software and/or hardware, to perform any or all of the functions described herein as being performed by a network element.

Examples of the UE 300 being programmed, in terms of software, to perform any or all of the functions described herein will now be discussed below. For example, the memory 356 may store a program including executable instructions corresponding to any or all of the operations described herein. According to at least one example embodiment, additionally or alternatively to being stored in the memory 356, the executable instructions may be stored in a computer-readable medium including, for example, an optical disc, flash drive, SD card, etc., and the UE 300 may include hardware for reading data stored on the computer readable-medium. Further, the processor 358 may be a processor configured to perform any or all of the operations described herein by reading and executing the executable instructions stored in at least one of the memory 356 and a computer readable storage medium loaded into hardware included in the UE 300 for reading computer-readable mediums.

Examples of the UE 300 being programmed, in terms of hardware, to perform any or all of the functions described herein will now be discussed below. Additionally or alternatively to executable instructions corresponding to the functions described as being performed by the UE 300 being stored in a memory or a computer-readable medium as is discussed above, the processor 358 may include a circuit that has a structural design dedicated to performing any or all of the operations described herein. For example, the above-referenced circuit included in the processor 358 may be a FPGA or ASIC physically programmed to perform any or all of the operations described herein.

The memory 356 may store computer-readable instructions 360 for operating in a user domain (or in other words, user space) and instructions 362 for operating the kernel.

In one example embodiment, the processor 358 executes instructions stored in the memory 356 to operate in the user domain and the network control domain. The processor 358 executes instructions stored in the memory 356 to operate in the network control domain and the user domain, obtain UE-side parameter values from the network control domain, the UE-side parameter values being specific to a user application in the user domain, provide the UE-side parameter values to a network proxy from the user domain and receive data in the network control domain based on the UE-side parameter values.

Figure 4:
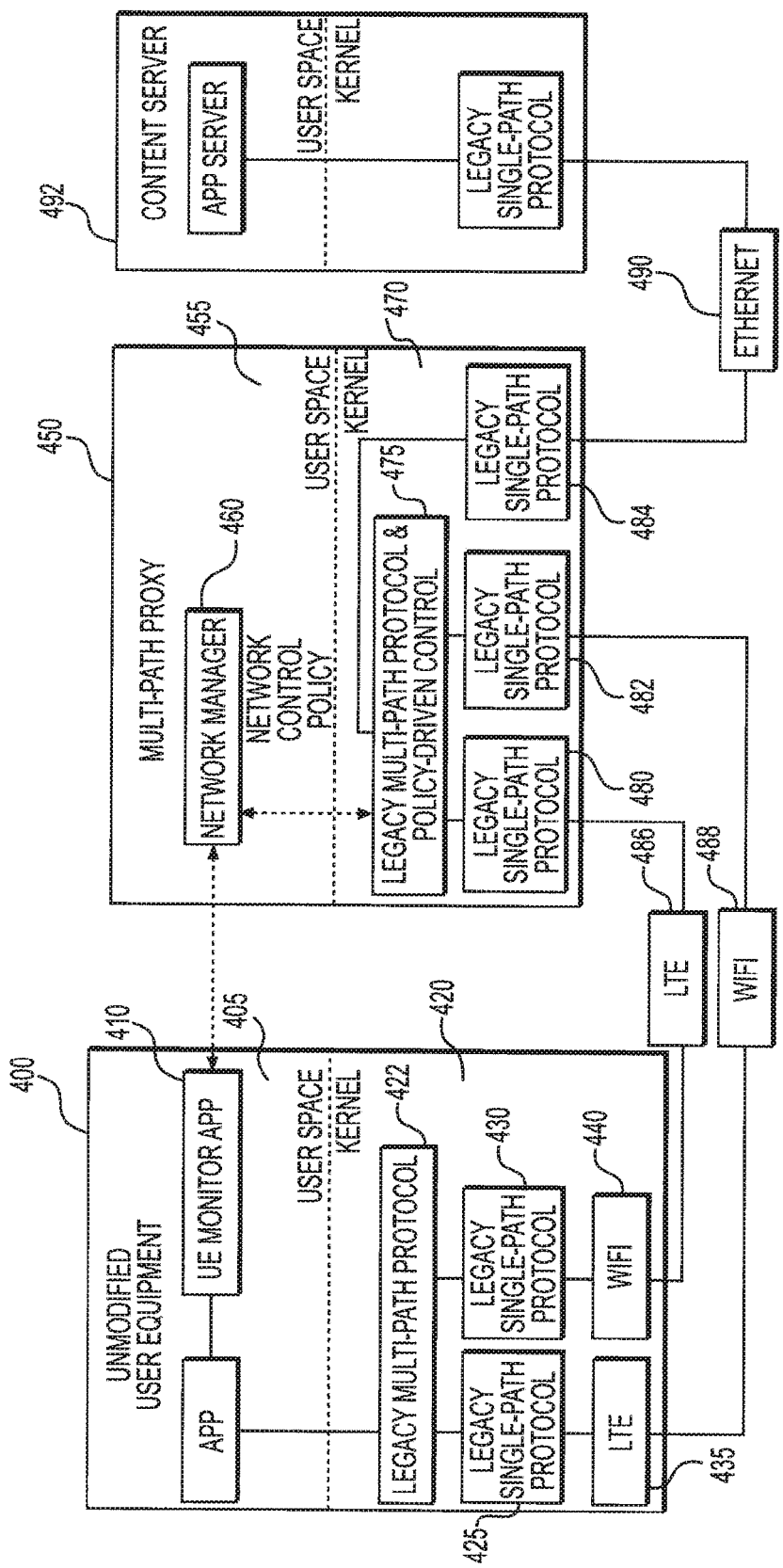

FIG. 4 illustrates a multi-connectivity communication system according to an example embodiment. The multi-connectivity communication system includes a UE 400, a network proxy 450 and a content server 492. The network proxy 450 may be referred to as a first network element and may have the same structure as the network element 200, shown in FIG. 2. The content server 492 may be referred to as a second network element. The UE 400 may have the same structure as the UE 300, shown in FIG. 3.

While only the UE 400, network proxy 450 and content server 492 are illustrated, it should be understood that the communication system has other elements that are commonly used in communication networks such as WiFi and LTE.

The UE 400 may operate in a user domain (or in other words, user space) 405 and a kernel 420 (i.e., a network control domain). The kernel 420 includes a multi-path protocol 422 that controls two legacy single-path protocol stacks 425, 430 (e.g., UDP or TCP/IP) to communicate over an LTE interface 435 and a WiFi interface 440, respectively.

The user domain 405 includes a monitor application 410 that collects the UE-side parameters from the kernel 420 and transmits them to a network manager 460 in a user domain (or in other words, user space) 455 of the network proxy 450. In an example embodiment, the UE-side parameters are sent to the network manager 460 through a communications path such as LTE and/or WiFi. In another example embodiment, out-of-band signaling may be used (UE-side parameters are delivered over a dedicated control session sending its own packets over LTE and/or WiFi), or in-band signaling (control messages are embedded into packets carrying actual data payload, e.g., into dedicated control fields of a packet header).

In addition to the user domain 455, the network proxy 450 includes a kernel 470 that includes a multi-path protocol and policy driven controller 475 for controlling single-path protocol stacks 480, 482 and 484 (e.g., UDP or TCP/IP) for communicating over LTE, WiFi and Ethernet interfaces 486, 488 and 490, respectively.

Given the challenges that make policy-driven control of multi-connectivity traffic difficult in legacy mobile user equipment (e.g., multi-path load balancing and traffic steering based on LTE/WiFi signal strength or UE battery status), example embodiments eliminate the need for any UE (kernel) modifications.

Example embodiments exploit the fact that a multi-path communications capable user equipment 400 connects to content servers (e.g., the content server 492), by default capable only of conventional single-path communications, by using the network proxy 450. The network proxy 450 is an intermediate entity and aggregates multi-path uplink (from interfaces 435 and 440) from the UE 400 and forwards it to the content server 480 over a single-path connection (the Ethernet interface 490). On the downlink, the process is reversed and ingress single-path traffic is split into multiple subflows.

As shown in FIG. 4, example embodiments flexibly control multi-path traffic based on unilateral actions of the network proxy 450 without the need for UE modifications within the UE kernel 420.

UE-side support for data collection and status monitoring that may be used for advanced network optimization would be implemented by using the monitor application 410. The monitor application 410 is a user-space client that collects the UE-side parameters from the kernel 420 and transmits them to the network manager 460 in the user domain 455 of the network proxy 450.

The monitor application 410 is either pre-installed in a memory (e.g., the memory 360) of the UE as part of a network operator software package or it may be downloaded and installed on-demand by a user. By default, the monitor application 410 would only engage in background communications with network management entities, but if requested (e.g., by the user or network proxy 450), the monitor application 410 may interact with the application users (e.g., to get a permission to improve QoS of interactive video calls with detected poor quality by activating multi-path communications).

In an example embodiment, the monitor application 410 does not need to be present in the UE 400 for the network proxy 450 to implement the policy-driven control. For example, the network proxy 450 uses locally available data such as round trip time measurement, congestion-related information such as a TCP congestion control window (CWND) and a TCP advertised receive window (RWND) as well as network layer information such as IP addresses and port numbers that indicate application type and server location to implement the policy-driven control.

For TCP, the network proxy 450 is a multipath-TCP (MPTCP) network proxy that unilaterally controls both downlink and uplink throughput for each subflow based on its own internal decision making process. Downlink throughput can be controlled through manipulation of the CWND, while uplink control can be achieved through manipulation of the RWND. Both of these values are contained within the TCP flow control block on the proxy machine, and therefore are modifiable by the network proxy 450.

The proxy decision-making can be based on its own local measurements (e.g., congestion, RTT) and/or UE-side parameter values provided by the UE-side client using UDP-based signaling (e.g., at least one of battery status indication, application type, channel condition, interface spectral bands and user mobility).

Radio access networks under operator control can also provide wireless link updates on actual channel condition and user spectral bands (i.e., coverage), while a destination IP and port can be used to identify application type.

As mentioned above, rate caps can be enforced by setting limits to CWND and RWND parameters of TCP based on the UE-side input. For example, only WiFi may be used (i.e., LTE max data rate is capped to zero) if a known (e.g., home) WiFi with good signal strength is detected. Alternatively, two available paths can be used only when a handset battery is sufficiently charged.

Figure 5:
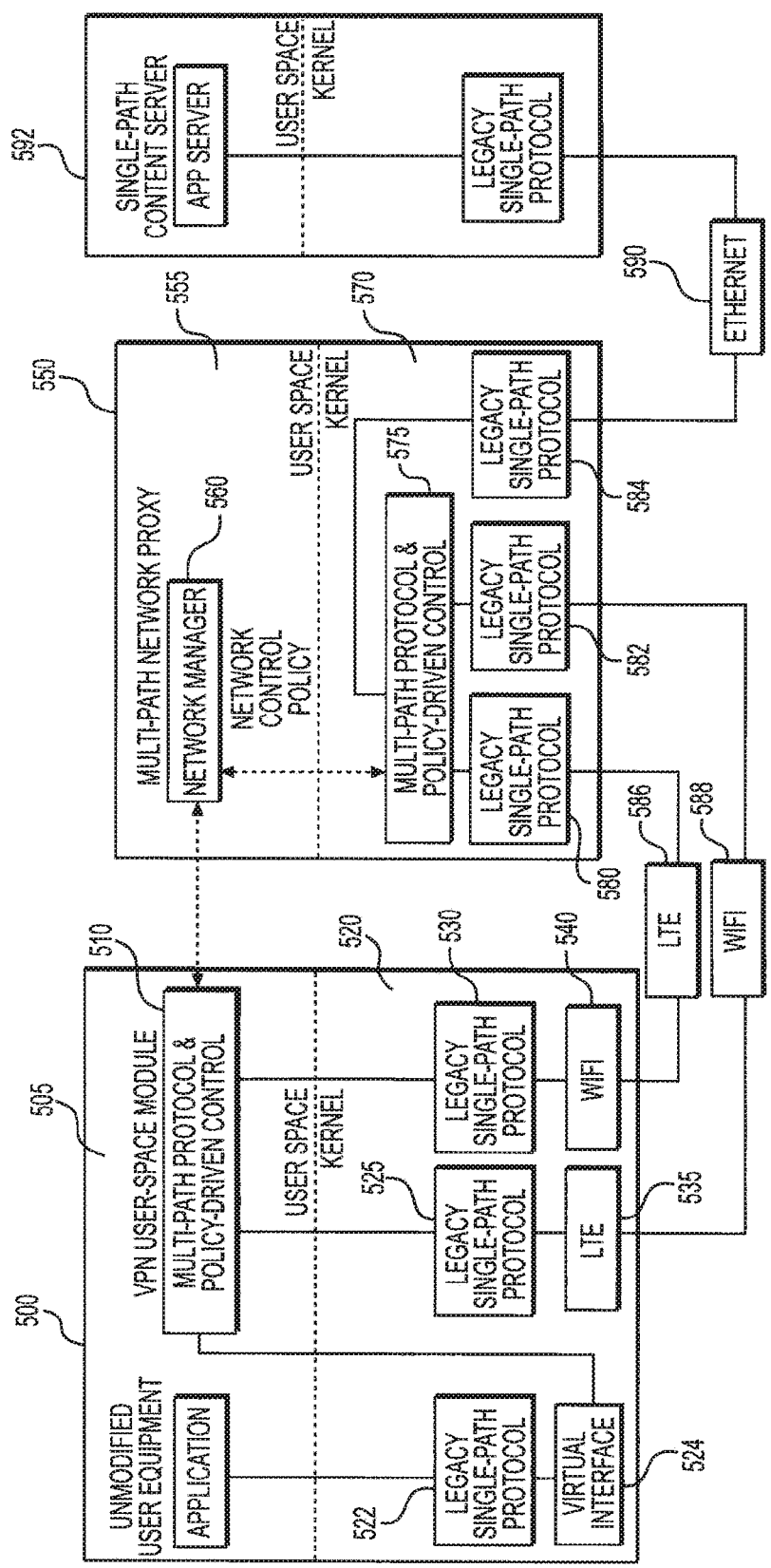

FIG. 5 illustrates a multi-connectivity communication system according to an example embodiment. As shown in FIG. 5, the multi-connectivity communication system includes a UE 500, a network proxy 550 and a content server 592. The network proxy 550 may be referred to as a first network element and may have the same structure as the network element 200, shown in FIG. 2. The content server 592 may be referred to as a second network element. The UE 500 may have the same structure as the UE 300, shown in FIG. 3.

While only the UE 500, network proxy 550 and content server 592 are illustrated, it should be understood that the communication system has other elements that are commonly used in communication networks such as WiFi and LTE.

The UE 500 may operate in a user domain (or in other words, user space) 505 and a kernel 520 (i.e., a network control domain). The kernel 520 includes a single-path protocol 522 (e.g., UDP or TCP/IP) for communicating over a virtual interface 524 to a virtual private network (VPN) module 510. VPN modules are conventionally used for data flow encryption, e.g., by using IPsec technology. In example embodiments, the VPN module 510 non-conventionally implements multi-connectivity by using the VPN framework. The kernel 520 further includes two legacy single-path protocol stacks 525, 530 (e.g., UDP or TCP/IP) to communicate over an LTE interface 535 and a WiFi interface 540, respectively.

The user domain 505 includes the virtual private network module 510 that collects the UE-side parameters from the kernel 520 and transmits them to a network manager 560 in a user domain (or in other words, user space) 555 of the network proxy 550. In an example embodiment, the UE-side parameters are sent to the network manager 560 from the VPN module 510 through a communications path such as LTE and/or WiFi. In another example embodiment, out-of-band signaling may be used (UE-side parameters are delivered over a dedicated control session sending its own packets over LTE and/or WiFi), or in-band signaling (control messages are embedded into packets carrying actual data payload, e.g., into dedicated control fields of a packet header).

In addition to the user domain 555, the network proxy includes a kernel 570 that includes a multi-path protocol and policy driven controller 575 for controlling single-path protocol stacks 580, 582 and 584 (e.g., UDP or TCP/IP) for communicating over LTE, WiFi and Ethernet interfaces 586, 588 and 590, respectively.

In FIG. 5, the network proxy 550 implements multi-connectivity and policy-driven control for User Datagram Protocol (UDP)-based traffic. Thus, the VPN module 510 utilizes the functionality of the monitor application 410 and the UE 500 uses a UE-side user-space architecture based on a framework for virtual private networks, which is described in FIGS. 9-14 of the specification and European Patent Application No. 16306173.2, filed on Sep. 15, 2016, the entire contents of which are hereby incorporated by reference.

UE application data is routed to/from a user-space VPN service via the virtual interface 524, configured in the UE 500. On the uplink, the VPN service splits the ingress single-path data flow of the application into multiple egress subflows, which are then forwarded over multiple physical interfaces (e.g., LTE interface 535 and WiFi interface 540) to the remote content server. More specifically, the VPN contains a multi-path scheduling layer which implements this split by scheduling data over multiple path. For example, every odd packet is sent over one path while the even packets are sent over the other path. On the downlink, multiple ingress subflows from the remote server are aggregated by the VPN service into a single data flow used by the application. The network proxy split process is reversed in a dedicated aggregation layer of the VPN. Packets received on multiple paths are merged into a single forwarding path. On the network side, the multi-path network proxy 550 acts as a counter-part of the UE-side VPN proxy (i.e., to aggregate the UL multi-path traffic and split the DL traffic among active paths) that inter-connects the UE 500 with the content server 592 over a legacy single-path connection.

As for the control plane, the network proxy (e.g., 550) and/or UE-side client are equipped with at least one controller, which can be the controller 575. The controller 575 implements policy control. The controller 575 can do so in a master role (i.e., the controller 575 decides what the policy objectives are) or the controller 575 can operate in a slave mode in which policy control commands come from a different entity implemented in a stand-alone remote server. The controller(s) implement dynamic policy-driven protocol and link selection as well as scheduling and link usage control based on inputs such as UE signal strength, link delay and base station load/congestion into account.

Example embodiments may be used where the transport layer in at least one of the single-path protocol stacks 580, 582 and 584 is based on MPTCP and/or multi-path UDP (MPUDP). MPUDP is way of sending data over the UDP protocol over multiple paths.

Multi-path UDP implements delivery of stand-alone UDP packets over multiple paths that may optimize the performance of the multi-path communications.

Individual applications can be associated with particular link and transport-layer protocols based on application-specific policies. The UE client can monitor how applications create individual data flows, i.e., associate flows and their source applications. Given this knowledge as well as the policy inputs on how to handle flows, the VPN module 510 can then choose a suitable protocol (e.g., MPTCP or MPUDP).

Policy-defining inputs on used/perceived quality of service and network optimization objectives can be collected from any of QoS stakeholders such as an application developer (e.g., defining application QoS category such as interactive video chat or buffered video streaming), an end user (e.g., establishing satisfaction with video smoothness and resolution), an operating system (e.g., controlling resource availability), radio interfaces (e.g., measuring actual signal strength and link delay), and/or a radio access network (e.g., aware of base station load and handover events).

Load Balancing and Traffic Steering Optimization

Multi-path communications over two independent radio access networks (e.g., 3GPP CDMA/LTE and IEEE WiFi standards) are described. However, example embodiments are not limited thereto.

In an example embodiment, a cloud infrastructure of the network operator hosts the network-side proxy (e.g., network proxy 450 or network proxy 550) that relays data to/from an application content server as well as implements application-specific policy-driven control of all data flows.

As an example, a live video stream may be sent over a best link (LTE or WiFi) while a simultaneous background system update can be downloaded over both links or the unused link, but with lower priority than the primary video stream.

UE-side support modules (e.g., the monitor application 410) can be used. In order to exchange policy information and control commands, both the monitor application 410 in the UE and the network proxy communicate by using either data-plane packets (e.g., by appending new packet headers, creating new header), or parallel out-of-band communication channels (e.g., dedicated UDP-based connections). For example, the network proxy may obtain UE-side parameter values using control messages in a shared bandwidth as data payload.

Policy-defining inputs such as quality-of-service category and link usage statistics are collected by means of pre-configured application profiles, an application programming interface (API), measurement polls, and/or from a network operator server. In FIG. 5, the network proxy 550 is an independent entity. However, in other example embodiments, the network proxy 550 functionality is part of the content server (e.g., as an MPTCP-capable server). Thus, the functions of the network proxy 550 and the functions of the content server would merge.

As described in the policy examples below, the network proxy may refer to the network proxy 450 and/or the network proxy 550.

Policy Example 1: Dynamic Throughput Aggregation

The "dynamic throughput aggregation" policy implies active usage of both LTE and WiFi at the same time in order to maximize an achievable data rate. This policy can be conditioned by a battery status of the UE. For example, it will be enforced only if the UE battery is charged to over a threshold percentage (e.g., 25%) of its capacity. If the UE battery is below the threshold percentage, the network proxy closes one of the data communications paths (LTE or WiFi) if both data communications paths are being used or maintains using one data communications path and does not open the other data communications path.

As shown by Table 1a (provided below) concerning UDP-based applications, tolerating out-of-order data delivery and/or implementing its own congestion control, the network proxy can configure maximum data rates R_max_LTE and R_max_WiFi for LTE and WiFi, respectively.

The baseline policy can be stated in at least two ways. The first way ("traffic offload" in Table 1a) consists in defining a total desired throughput R_total and the LTE component R_max_LTE. The second way ("fractional divide" in Table 1a) specifies the total desired throughput R_total as well as how it is divided between the LTE and WiFi links (factor LW_ratio, 0<LW_ratio<1). The factor LW_ratio is determined based on operator needs and empirical data. The factor LW_ratio is an input parameter. For example, an operator who wishes to offload more traffic to a WiFi segment (cheaper bit per dollar) will choose the factor LW_RATIO to be closer to 1. The parameters in Table 1a are policy-defined parameters.

TABLE 1a

Dynamic throughput aggregation policies for UDP-based applications.

| | LTE | WiFi |
| --- | --- | --- |
| max throughput: | R_max_LTE | R_max_WiFi |
| flexible aggregation: (traffic offload) | R_max_LTE | R_total − R_max_LTE |
| flexible aggregation: (fractional divide) | LW_ratio * R_total | (1 − LW_ratio) * R_total |

Table 1b (provided below) summarizes the same policies for TCP-based applications that use in-order data delivery and built-in TCP congestion control. Individual policies are the same as those of Table 1a. The only difference is that actual sender data rate is computed as a minimum min[R_max_LTE, R_cc_LTE] (for LTE) and min[R_max_WiFi, R_cc_WiFi] (for WiFi) of desired rates R_max_LTE and R_max_WiFi, respectively, and currently feasible data rates R_cc_LTE and R_cc_WiFi, respectively, as detected by the TCP congestion control mechanism. R_cc_LTE and R_cc_WiFi are not policy-defined parameters, while the remaining parameters are policy-defined. The parameter R_cc corresponds to the congestion window (CWND), which is an internal parameter of each TCP session. The parameter R_cc can be retrieved by TCP state monitoring. The parameter R_Max is a predefined and/or selected maximum cap for CWND which effectively sets the maximum data rate (roughly, data rate~CWND/RTT).

TABLE 1b

Dynamic throughput aggregation policies for TCP-based applications. Red font color denotes policy-defined parameters while black font color denotes parameters of TCP congestion control.

| | LTE | WiFi |
| --- | --- | --- |
| max throughput: | min[R_cc_LTE, R_max_LTE] | min[R_cc_WiFi, R_max_WiFi] |
| flexible aggregation: (traffic offload) | min[R_cc_LTE, R_max_LTE] | min[R_cc_WiFi, R_total − min (R_cc_LTE, R_max_LTE)] |
| flexible aggregation: (fractional divide) | min[R_cc_LTE, LW_ratio * R_total] | min[R_cc_WiFi, (1 − LW_ratio) * R_total] |

Policy Example 2: Dynamic Best-Link Selection

Under the link selection policy, only one link, either LTE or WiFi, is available to a given application. The link is selected dynamically by the network proxy based on a pre-defined objective function (utility) combining metrics such as signal strength or achievable data rate.

Table 2 (provided below) summarizes selection criteria applicable to UDP-based applications.

In a WiFi mode, strong WiFi access points (APs) (e.g., home WiFi AP with free uncongested access) are detected by the UE. This is done based on comparing an absolute WiFi received signal strength RSSI_WiFi with a minimum required threshold RSSI_min (e.g., −45 dBm). A selection hysteresis RSSI_hyst is used from standard handover procedures to avoid ping-pong handovers.

In a coverage mode optimizing coverage robustness, a strongest serving entity, an LTE base station or a WiFi access point, is chosen by the network proxy based on a relative comparison of received signal strength indicators (RSSI) as known from conventional handover procedures. Herein, a received signal strength RSSI_serving of the current serving entity is compared to a target received signal strength RSSI_target of the alternative base station while taking into account the handover hysteresis RSSI_hyst as well.

In an inter-active mode, a similar comparison is carried out except that the optimized metric is link round trip time (RTT) where RTT_serving is the round trip time from the UE to the serving entity and RTT_hyst is a hysteresis value for the round trip time. Analogically, achievable data rate, as detected by TCP congestion control, can be used as a link selection metric.

TABLE 2

Dynamic best-link selection policies for both UDP-based and TCP-based applications.

| | | |
| --- | --- | --- |
| WiFi mode: | if RSSI_WiFi + RSSI_hyst > RSSI_min | |
| coverage mode: | if RSSI_target − RSSI_serving − RSSI_hyst > 0 | |
| inter-active mode: | if RTT_target − RTT_serving − RTT_hyst < 0 | |
| | target link: | R_max_TGT |
| | else | |
| | serving link: | R_max_SRV |
| | End | |

Policy 3: QoS-Aware Scheduling

Once multiple links are selected, an application-specific multi-path scheduler can be configured by the network proxy. For capacity-oriented applications (e.g., buffered video such as YouTube™), a lowest-RTT-first scheduler may be used by the network proxy. For latency-sensitive applications (e.g., interactive video calls), latency-minimizing schedulers can be used by the network proxy that use known techniques of out-of-order scheduling for in-order delivery over multiple paths.

Flexible Policy-Driven Control

Example 1: TCP-Based Traffic

Figure 6:
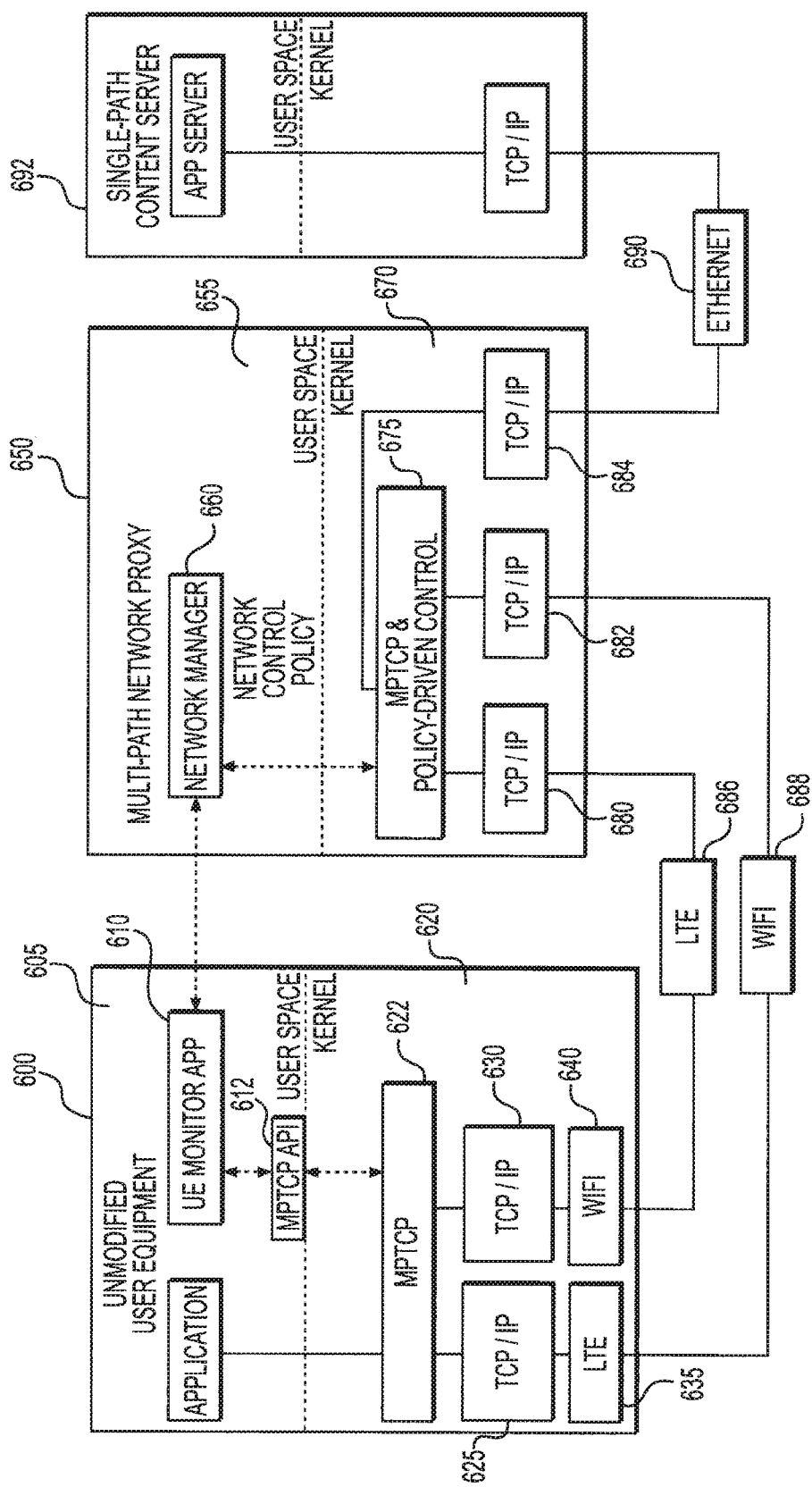

FIG. 6 illustrates a communication system using policy-driven control of a kernel-based MPTCP in a UE. In FIG. 6, data traffic of TCP-based applications is transported by means of kernel-based MPTCP.

The multi-connectivity communication system includes a UE 600, a network proxy 650 and a content server 692. The network proxy 650 may be referred to as a first network element and may have the same structure as the network element 200, shown in FIG. 2. The server 692 may be referred to as a second network element. The UE 600 may have the same structure as the UE 300, shown in FIG. 3.

While only the UE 600, network proxy 650 and content server 692 are illustrated, it should be understood that the communication system has other elements that are commonly used in communication networks such as WiFi and LTE.

The UE 600 may operate in a user domain (or in other words, user space) 605 and a kernel 620 (i.e., a network control domain). The kernel 620 includes a MPTCP 622 that controls TCP/IP protocol paths 625, 630 to communicate over an LTE interface 635 and a WiFi interface 640, respectively.

The user domain 605 includes a monitor application 610 that interacts with an MPTCP API 612 that collects the UE-side parameters from the kernel 620 and transmits them to a network manager 660 in a user domain (or in other words, user space) 655 of the network proxy 650.

The network proxy 650 may be the same as the network proxy 450, with the transport control being an MPTCP controller 675 and transport protocol stacks being TCP/IP protocols 680, 682 and 684 that communicate over an LTE interface 686, a WiFi interface 688 and an Ethernet interface 690, respectively.

According to FIG. 6, the network proxy 650 explicitly caps the TCP congestion window (CWND) parameter for each TCP subflow to limit a downlink send rate for each radio interface according to policy requirements, set by a network management entity.

On the uplink with the UE 600 being the sender, the network proxy 650 achieves the control objectives of the network manager indirectly by means of capping the advertised receive window (RWND) of each TCP subflow. A user-space utility of the operator passes the CWND and RWND caps by using NETLINK sockets, an established framework for inter-process communications.

In order to obtain inputs for its policy-driven decision-making, the network proxy 650 can estimate RFT and congestion levels by using its own local measurements. To determine UE-side conditions, the monitor application 610 operates as a background process to deliver UE-side parameter values such as application type and QoS class associated with each unique combination of IP addresses and port numbers, received signal strength and operating band for each (active) radio access interface, and UE battery status.

The monitor application 610 can also actively engage MPTCP control on behalf of the network proxy 650 using the MPTCP API 612.

For example, the user-space client can retrieve information on application system calls (socket options) or configure how the UE 600 dynamically adjusts the RWND parameters for ingress downlink TCP traffic (e.g., based on memory availability for the receive buffer without any OS-specific capping if network policy control is active to avoid interference with the control actions of the network proxy).

Figure 7:
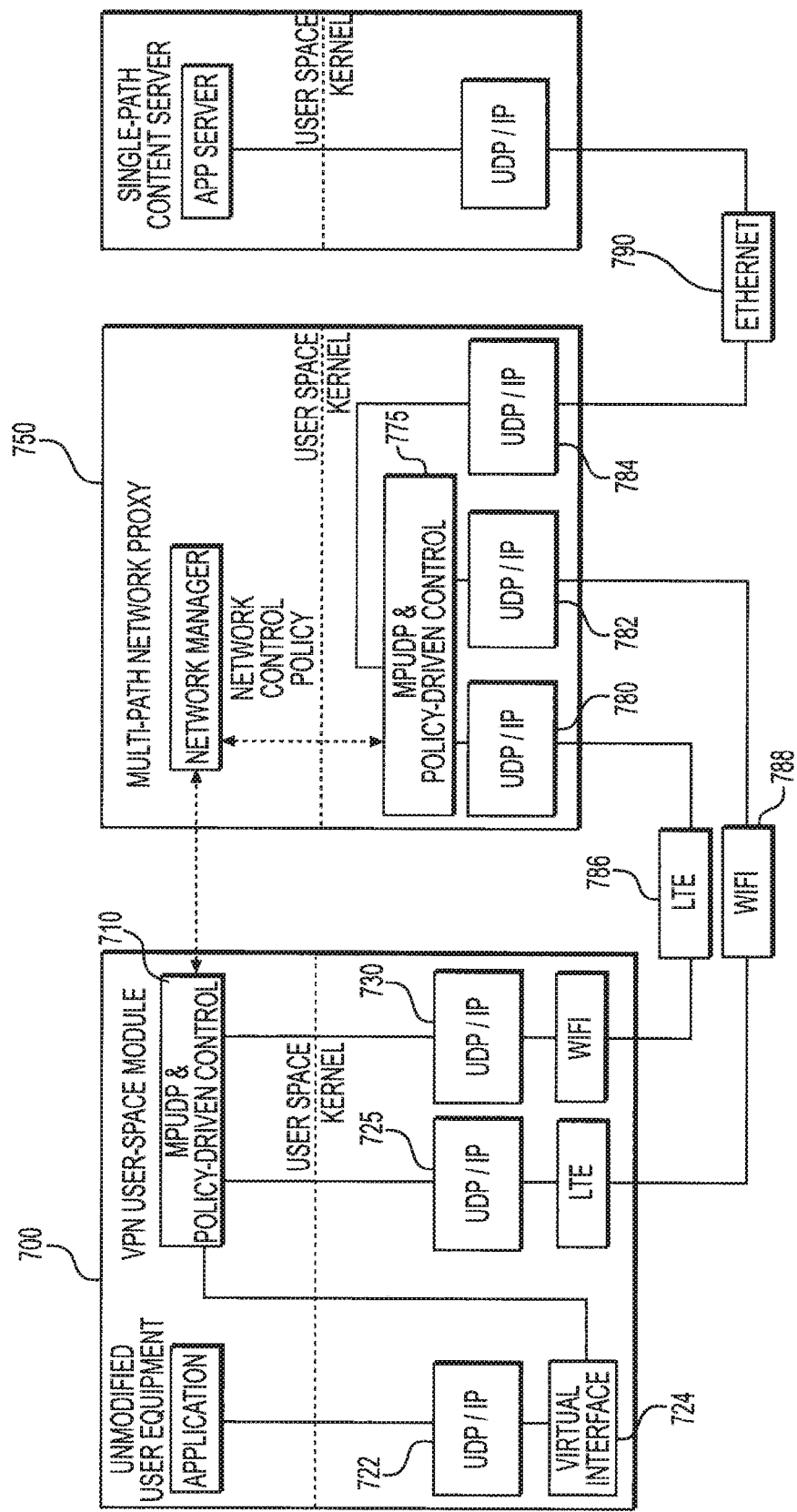

FIG. 7 illustrates another communication system according to an example embodiment. The communication system shown in FIG. 7 is the same as the communication system shown in FIG. 5, except a network proxy 750 includes an MPUDP controller 775 and transport protocol stacks being UDP/IP protocols 780, 782 and 784 that communicate over an LTE interface 786, a WiFi interface 788 and an Ethernet interface 790, respectively. Moreover, a UE 700 includes UDP/IP protocol stacks 722, 725 and 730. A VPN-based proxy 710 uses MPUDP.

In FIG. 7, the VPN-based proxy 710 is deployed in the UE 700. The VPN proxy 710 with the virtual interface 724 splits uplink UDP streams by opening and scheduling multiple UDP sockets and reverses the process on the downlink.

Both the VPN proxy 710 and the network proxy 750 are equipped with inter-connected control modules that implement application-specific control policies. Since the VPN natively implements the MPUDP data plane, the addition of any control-plane functionality is implemented.

Figure 8:
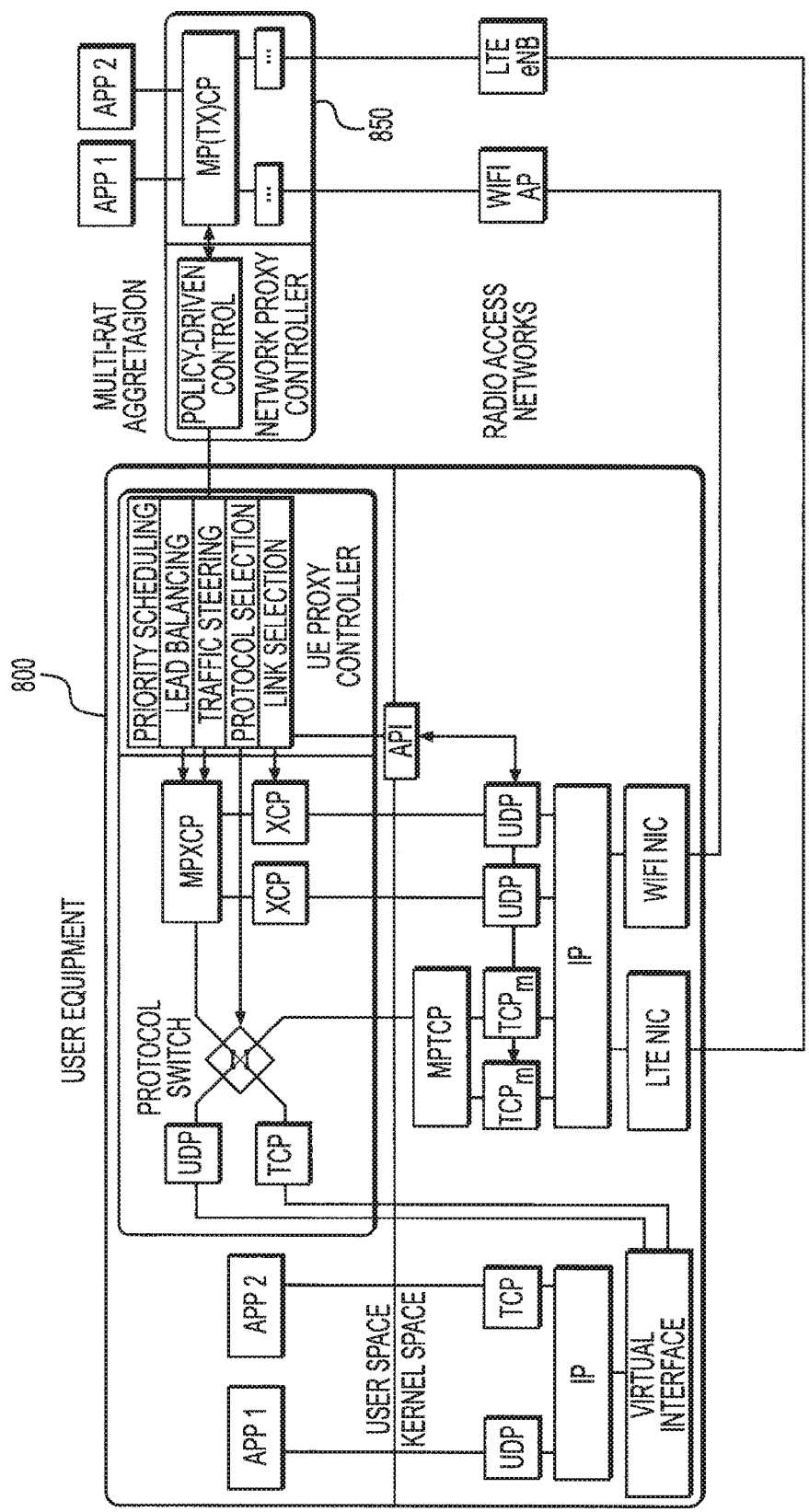

FIG. 8 shows how FIGS. 6-7 can both be integrated within a VPN framework including a UE 800 and a network proxy 850. A dedicated API provided by the operating system (OS) developer could enhance system controllability by exposing system call details (socket options) to the VPN proxy. The multi-path protocol can be implemented in the user space and/or the kernel in the network side proxy and the UE.

VPN Framework

FIGS. 9-14 illustrate a framework for example embodiments, particularly the VPN framework according to example embodiments. Conversion logic is provided within the user domain of the user equipment and an intermediate proxy node with corresponding conversion logic is located between the user equipment and the entity with which it is communicating which may be a server. This conversion logic converts between a single data stream and multiple data streams and provides information which relate the single and multiple data streams to each other in headers compliant with a protocol that both conversion logics can decode. The data streams comprise further headers compliant with transport protocols according to particular standards which allow the network side and network control domain of the user equipment to route the data streams without requiring any modification.

In this way, the conversion logic in addition to splitting the data stream or recombining them will change the header information associated with the data streams such that where a single data stream is formed into multiple streams, an additional header is added relating the multiple streams to the single stream. This additional header is compliant with a protocol which may be a legacy protocol but which can also be a proprietary protocol as it is to be interpreted only by the conversion logic within the user equipment and the intermediate proxy node. The information in this header allows the multiple data streams to be recombined to form a single data stream and may also provide some sort of error correction facility.

Where the conversion logic is recombining the multiple data streams to form a single data stream, then the header according to this protocol is decoded and interpreted such that the multiple data stream can be reformed to form a single data stream. A header is then added to this single data stream which should be compliant with a standardized transport protocol and which may be the protocol that was originally used with the original single data stream. In this way, when the data stream arrives at its destination it does not look as though it has been altered in any way.

In addition to adding the headers relating the single to the multiple streams, a transport protocol header is added which is a standardized transport protocol and allows the multiple data streams to be routed between the intermediate proxy node and the user equipment. This transport protocol may be a transport protocol indicating where the multiple data streams are to go as any additional functionality such as error correction facilities may be included in the header relating the single to the multiple data streams. In other examples, it may be the same transport protocol as is used with the single data stream.

Multi path connectivity is enabled by taking advantage of the standard user-space framework for virtual private networks that is provided in a user equipment. This virtual private network provides a way of diverting a data stream output towards a particular socket back to the user domain where an application in this case a conversion algorithm can amend the data stream which can then be output towards multiple sockets.

Establishing multi-path connectivity in the user-space mode is advantageous in that it can be done by downloading and installing a specialized application which may be created and posted by the network operator. The need for phone unlocking and/or super user access is thus eliminated. Moreover, both standardized and non-standardized protocols for multi-path communications can be implemented using the standard virtual private network framework, even in legacy user equipment.

Figure 9:
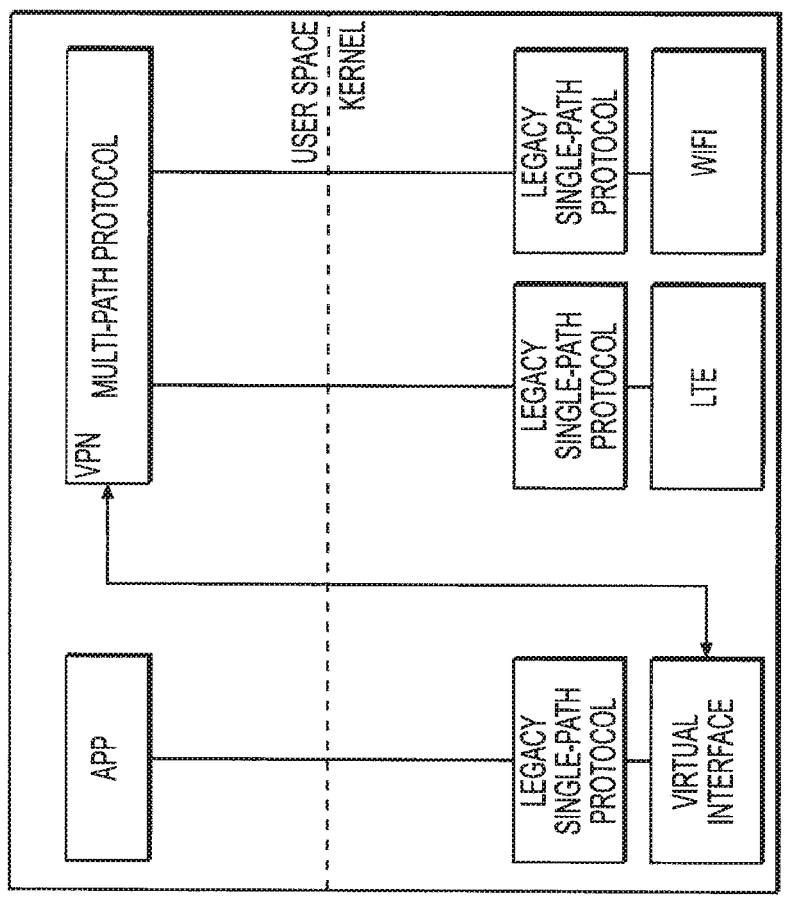

FIG. 9 schematically shows a user equipment. In FIG. 9 (and similarly FIGS. 4-8 and 10-12), uplink data travels from an application on the UE towards the network and downlink data such as video data is received at UE and sent to an application such as a viewing application for that video data.

Application data generated by an application within the user domain is routed to/from a conversion application providing a multi-path protocol within a virtual private network in the user domain via a virtual interface within the kernel or network control domain of the user equipment. The application generates data and outputs it towards an output socket in a conventional way via the kernel. The data stream has headers compliant with a legacy single path transport protocol. The data stream is intercepted by the virtual interface and diverted to the conversion application within the virtual private network. Thus, during uplink, the virtual private network (VPN) service splits the ingress single path data flow of the application into multiple egress sub flows which are then forwarded over multiple physical interfaces, for example LTE and WiFi to the remote content server, via an intermediate proxy node.

During uplink, the conversion logic within the VPN acts by removing the headers compliant with the single path transport protocol dividing the stream in multiple streams and adding headers compliant with a multi path protocol. Additional headers according to a legacy single path transport protocol are then added and are used by the network to route the multiple streams. These headers indicate that the multiple data streams are to be routed via an intermediate proxy node.

Where downlink data is received at the user equipment, this is received as multiple ingress sub flows formed from a single data stream output by the remote server which has traveled via an intermediate proxy node and been divided into the multiple data streams which are received at the different interfaces. Each data stream has headers of a single path transport protocol and additional headers and are routed by the kernel to the virtual private network with the conversion logic. Here the multiple data streams are aggregated by the conversion logic into a single data flow with legacy single path protocol compliant headers. This single data flow is then then routed via the virtual interface to the application.

Figure 10:
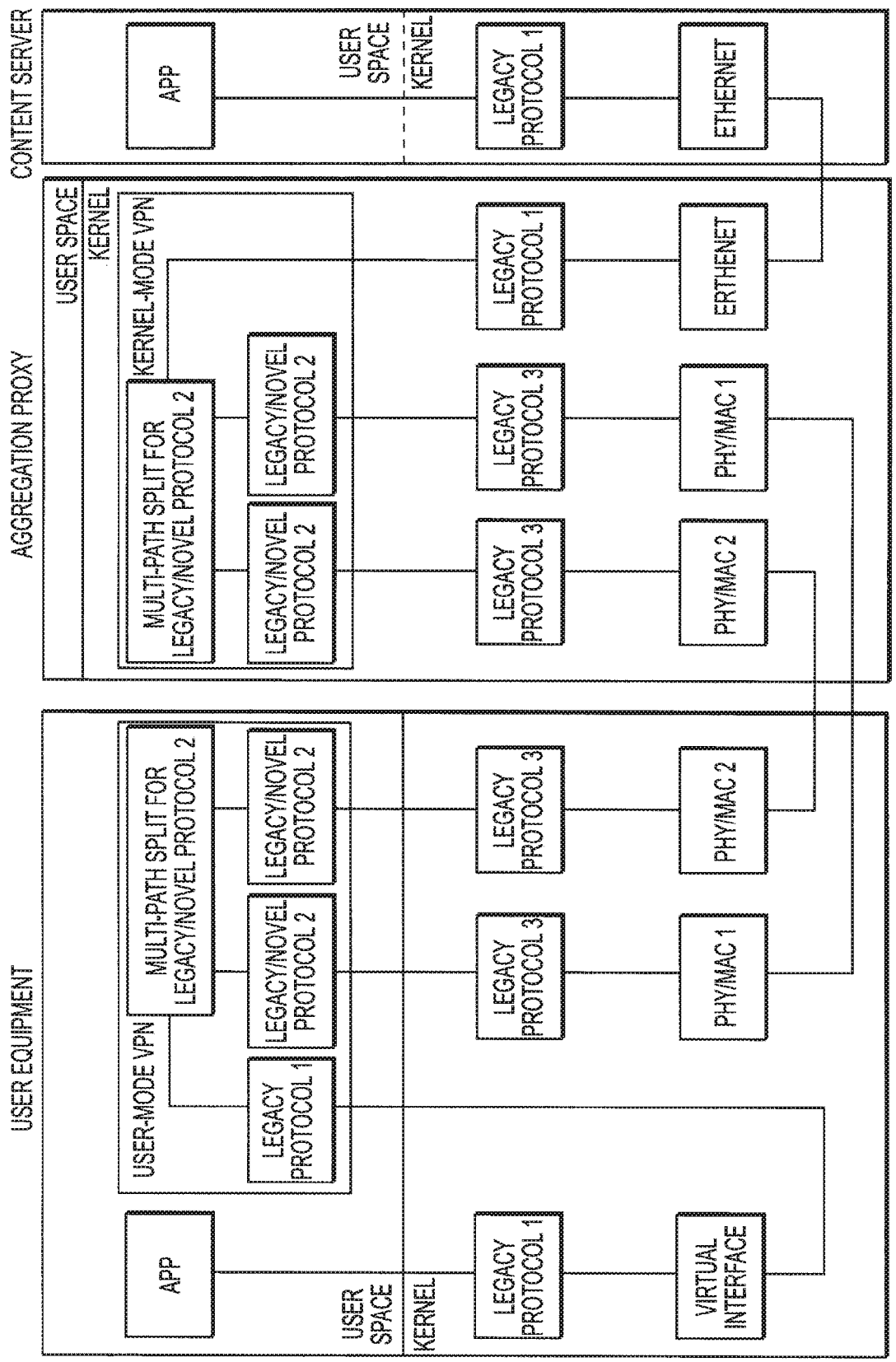

FIG. 10 shows an overview of the architecture of the system comprising the user equipment, the intermediate proxy node and the content server. A legacy user equipment can be adapted for operation where an operator has posted a conversion application and the user downloads and activates it. The conversion application activates the virtual private network feature that is available in many user equipment operating systems and uses this in conjunction with conversion logic to convert between single and multiple data streams.

Thus, as is shown in FIG. 10, the user application APP opens a network socket in order to exchange data with a remote content server using a single path legacy protocol 1, via the non-modified kernel. The output data is routed via a virtual interface which is part of the activated virtual private network and diverted to/from the user-space VPN service.

On the uplink the VPN service will terminate the connection based on the legacy protocol 1 in order to extract the payload data. The data will then be forwarded over multiple physical interfaces denoted by PHY/MAC in FIG. 10 to an operator deployed aggregation or intermediate proxy node using a generic multi-path "protocol 2". "Protocol 2" can consist of either a known legacy protocol such as TCP or it can be a novel/proprietary/enhanced protocol (TCP with optimization for low latency as described subsequently). Additional headers according to the "legacy protocol 3" of the non-modified kernel serve as the actual transport protocol for the multiple data streams. Thus, much of the information regarding the multiple data streams is provided by protocol 2, while the transport/routing of the multiple data streams is controlled in accordance with information in the headers compliant with legacy protocol 3.

The aggregation or intermediate proxy is located between the UE and the remote content server and acts as a connection—split proxy, that is to say it terminates the multi-path connection with the UE based on the protocol 2 information and forwards the aggregated data as a single data stream using the original legacy protocol 1 headers to communicate with the server for example over Ethernet. Since the aggregation proxy is under the control of the network operator or enterprise service provider, the VPN performance may be improved by executing it in the kernel mode as indicated in the example of FIG. 10.

Downlink operation is conducted by the same steps but in the reverse order. Thus, data generated by the content server having headers compliant with legacy protocol 1 is transported over the Ethernet and intercepted by the aggregation proxy where conversion logic within the aggregation proxy will split the single data stream into multiple data streams and provide them with header information compliant with a legacy or novel protocol 2 providing multi-path information and with an additional header compliant with legacy protocol 3 and comprising transport or routing information. The multiple data streams are then routed over different interfaces to the user equipment where conversion logic combines the multiple data streams using the information in the protocol 2 headers.

Figure 11:
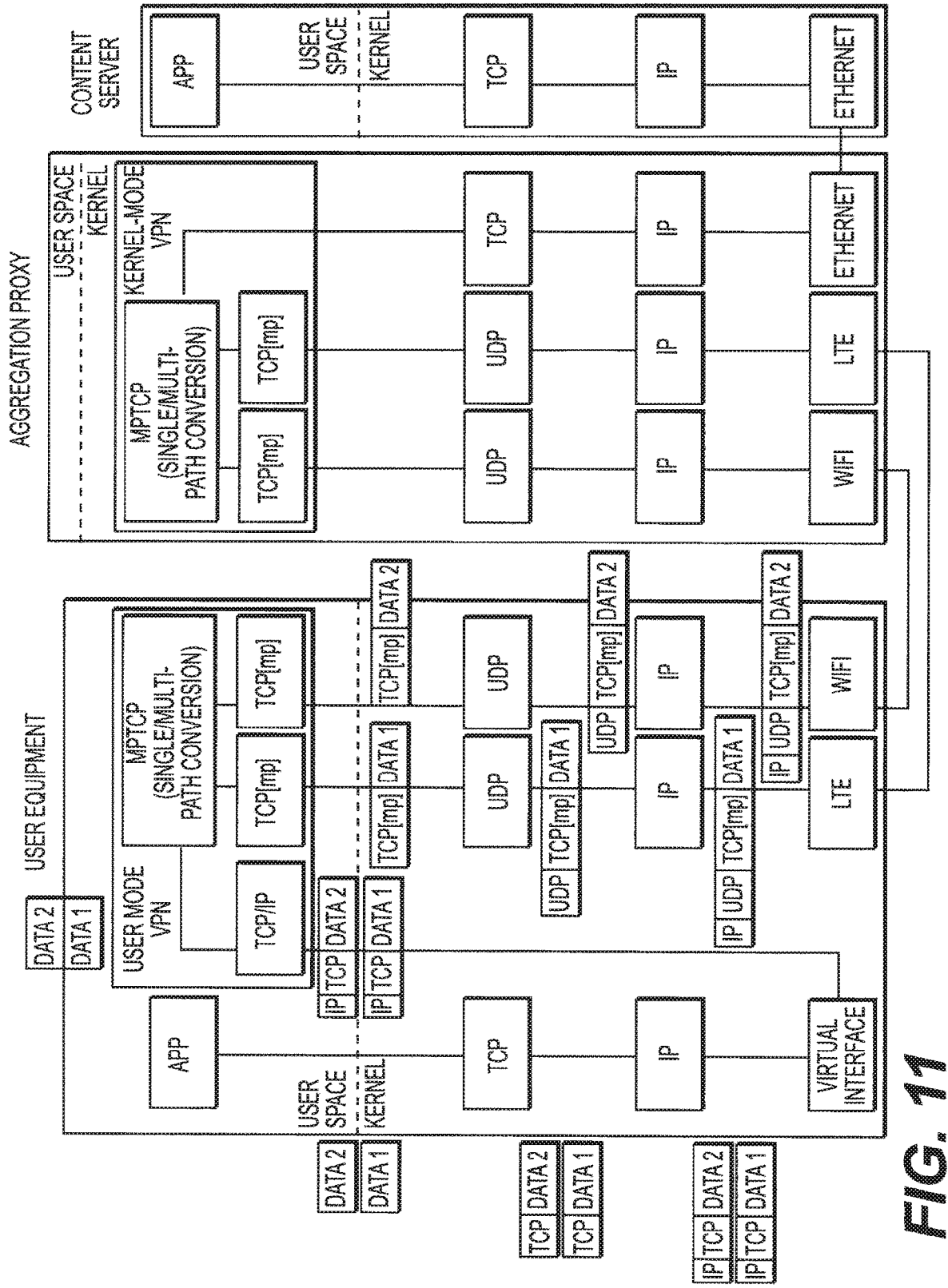

An example of using legacy multi-path TCP as protocol 2 is shown in FIG. 11 and detailed below. In this example, the network operator activates the legacy MPTCP functionality for multi-path communications in legacy user equipment.

As shown in FIG. 11, the TCP/IP protocol suite is used to implement the "legacy protocol 1" for the headers associated with the single data stream which is diverted at the virtual interface to the conversion logic within the user mode (VPN). Here, the stream is split into multiple data streams and headers according to "protocol 2" which consists of the dual-layer stack for the IETF standardized MTCP are added to the multiple data streams. Thus, in FIG. 11, a standardized multi-path protocol is used when the single data stream is split to multiple data streams. This is denoted within FIG. 11 by using TCP (MP) to indicate their dependence on the MPTCP sub layer, for example in the form of MTCP options for the standardized TCP headers.

In this example, UDP/IP is used as the transport layer, that is the "legacy protocol 3" transport header, however TCP/IP could be used instead. If super-user access is available, protocol-less RAW sockets could be taken advantage of. To ensure privacy and security, the transport over untrusted media such as public WiFi can be enhanced by cryptographic tunnels, for example, IPSec (Internet Protocol Security). The multi-path data streams with these headers are routed to the intermediate proxy node where conversion logic in the kernel mode VPN does the multi-path to single path conversion and they are then transported further across the Ethernet with legacy TCP protocol headers. For download data the paths are reversed.

Figure 12:
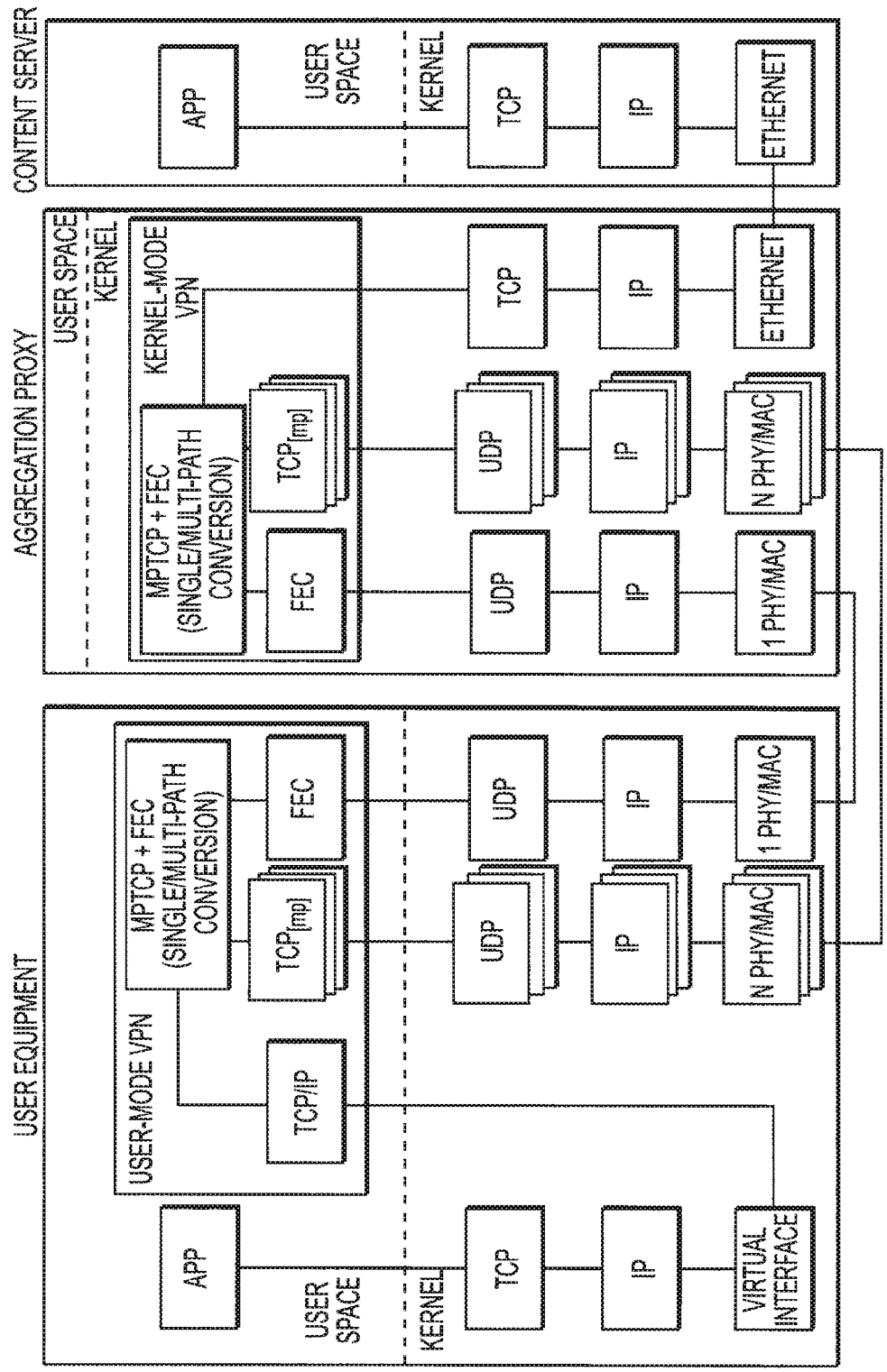

FIG. 12 shows a further example which differs from the example of FIG. 11 by using a multi-path TCP for 5G low latency high bandwidth communications. This allows the MPTCP scheduler to send packet level forward error correction (FEC) information over a parallel UDP connection. It should be noted that although in FIG. 12 the error correction information is sent on its own parallel path, it may be sent alongside data in different parallel multi-paths.

In FIG. 12, every P packets of payload data are accompanied by F packets of forward error correction data generated from the preceding P packets of payload data at the conversion logic. The FEC packets allow for proactive instantaneous recovery for up to F lost packets of payload data without resorting to retransmissions. Control of the P/F ratio provides control of end to end latency and quality of service.

Figure 13:
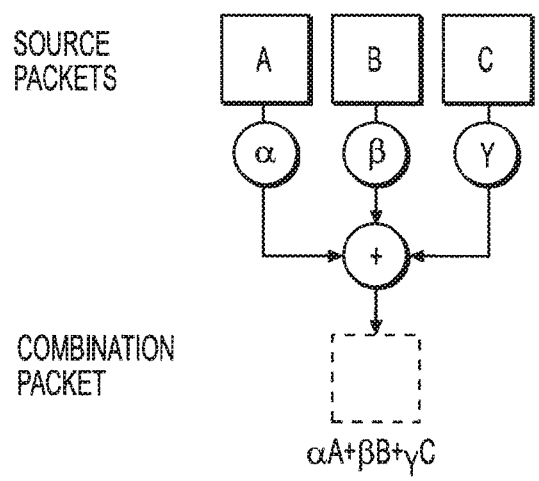
Figure 14:
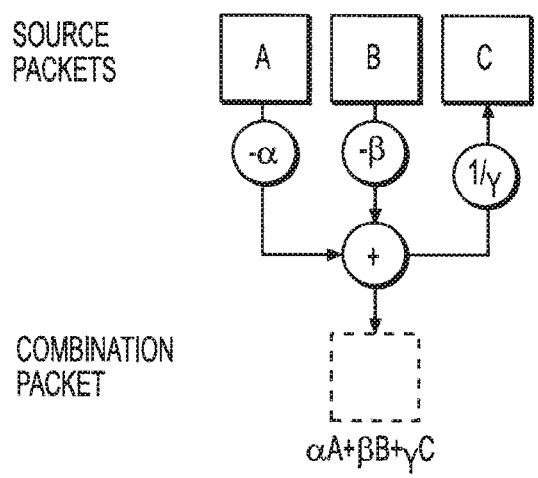

The FEC data can be generated in the form of random linear combinations, combining multiple data source packets A, B and C into so called combination packets as is shown in FIG. 13. The combination packet is generated as a weighted random linear combination of several payload packets by using a binary XOR operation. Multiplicative weights $\alpha$, $\beta$ and $\gamma$ are selected at random in an identical, independent, uniform manner. The recovery of a payload packet can be done in real time by using the received source/combination packets and Gaussian elimination as shown in FIG. 14.

The FEC data is generated at the conversion logic in the user equipment for uplink transmissions and in the conversion logic in the intermediate proxy node for downlink transmissions.

The capability to aggregate multiple independent data delivery links into one logical connection can significantly increase the overall throughput as well as reduce end-to-end latency thanks to resource pooling and multiplexing. Unlike standard carrier aggregation, the use of inter-RAT bandwidth aggregation is not limited by the per-RAT spectrum availability.

Multi-path communications also allow temporary bandwidth outages to be masked out by using adaptive link multiplexing. At the same time, the deploying of arbitrary proprietary protocols to provide the multi-path information can be used to e.g. control the end-to-end latency by using redundancy encoding in the form of packet-level forward error correction. Providing control of the bandwidth-latency trade-off provides a basis for efficient quality-of-service provisioning.

A further advantage is that they allow network operators to efficiently reuse their existing multi-band multi-technology infrastructure and offer high-speed connections without incurring the significant costs associated with the roll-out of a new high-performance network.

Figure 15:
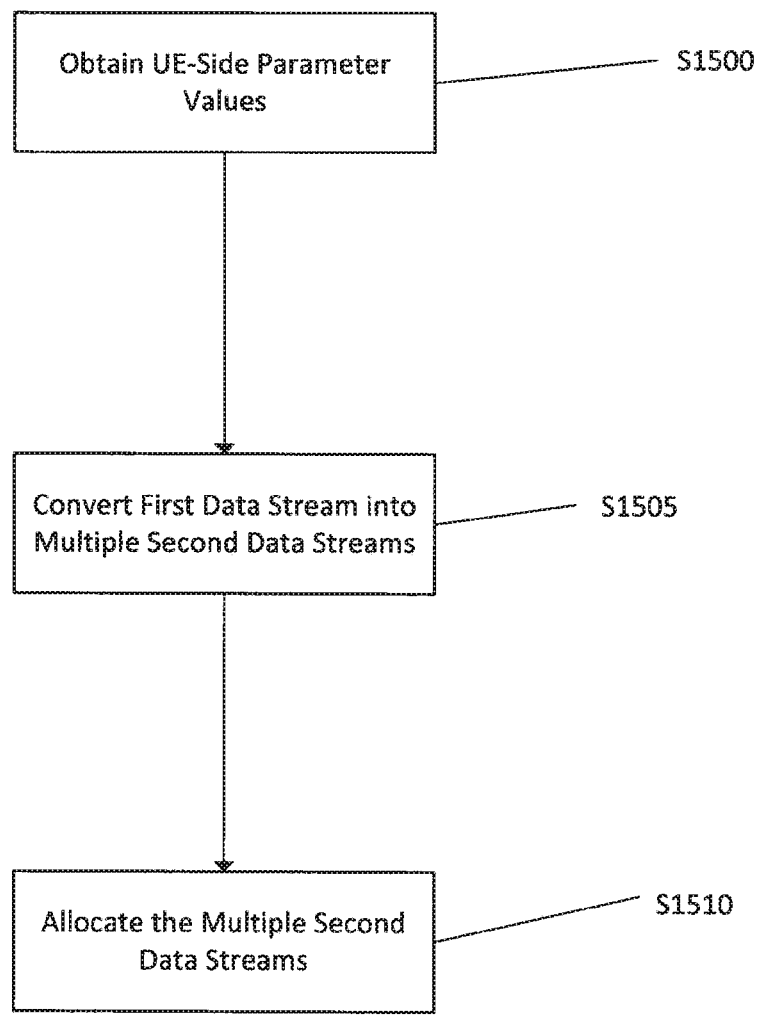

FIG. 15 illustrates a method according to an example embodiment. The description of FIG. 15 may be performed by a first network element, which may be the network proxy 450, the network proxy 550, the network proxy 650 or the network proxy 750. The network proxy 450, the network proxy 550, the network proxy 650 and the network proxy 750 are configured to perform the steps shown in FIG. 15 with the functionality described above. Thus, the structure illustrated in FIG. 2 causes the first network element to perform the method of FIG. 15.

At S1500, the first network element obtains user equipment (UE)-side parameter values from a user domain of a UE. As described above, the UE-side parameter values are at least one of values determined by the UE and values known by the UE.

At S1505, the first network element converts a first data stream received from a second network element (e.g., a content server) into multiple second data streams over multiple data communication paths between the first network element and the UE.

At S1510, the first network element allocates the multiple second data streams to at least one of the multiple data communication paths based on the UE-side parameter values. The first network element may configure the streams on each path, independently of whether there is one-to-one stream/path mapping. The first network element may transmit the allocated data streams over the at least one of the multiple data communication paths.

Figure 16:
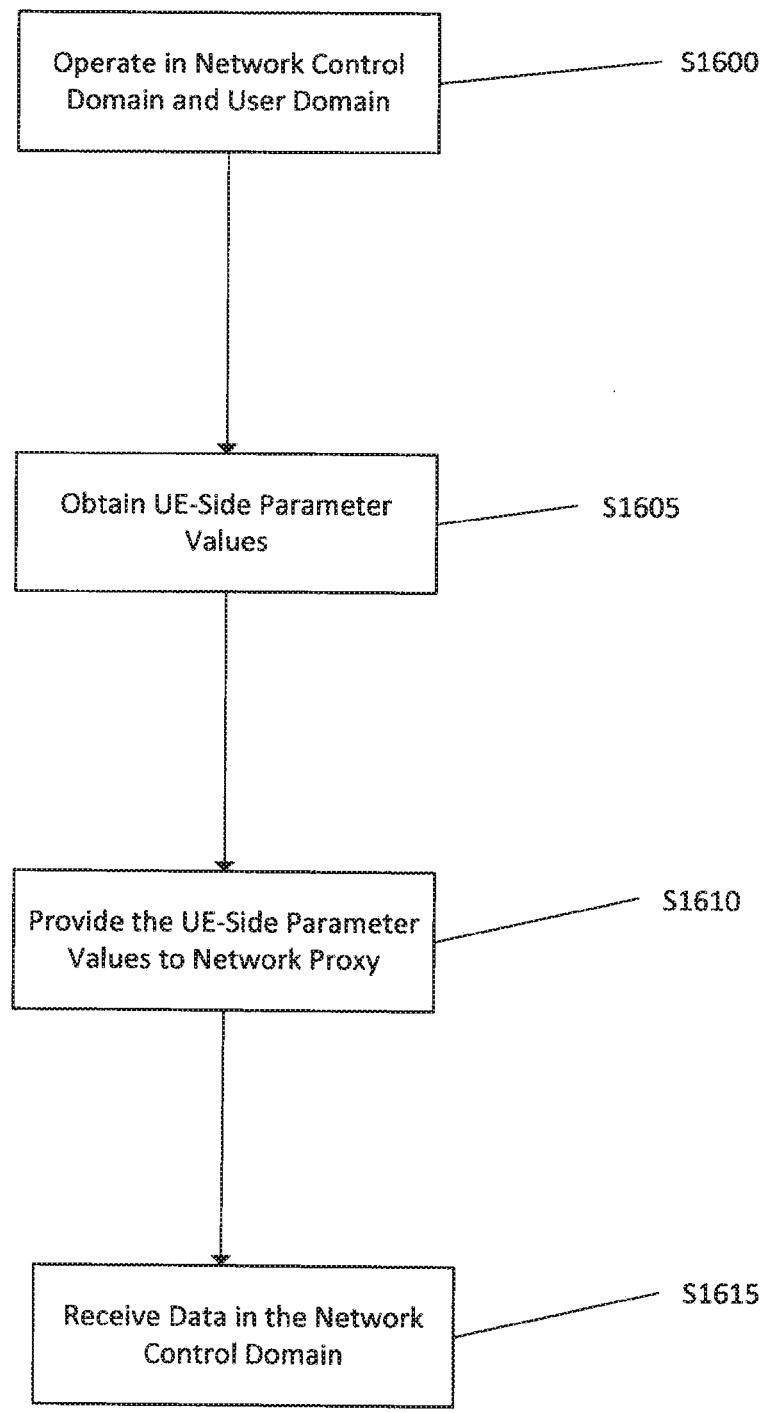

FIG. 16 illustrates a method according to an example embodiment. The description of FIG. 16 may be performed by the UE 400, the UE 500, the UE 600 or the UE 700. The UE 400, the UE 500, the UE 600 and the UE 700 are configured to perform the steps shown in FIG. 16 with the functionality described above. Thus, the structure illustrated in FIG. 3 causes the UE to perform the method of FIG. 16.

At S1600, the UE operates in a network control domain and a user domain.

At S1605, the UE obtains UE-side parameter values from the network control domain. As described above, the UE-side parameter values may be specific to a user application in the user domain and are at least one of values determined by the UE and values known by the UE.

At S1610, the UE provides the UE-side parameter values to a network proxy from the user domain.

At S1615, the UE receives data in the network control domain based on the UE-side parameter values.

Figure 17:
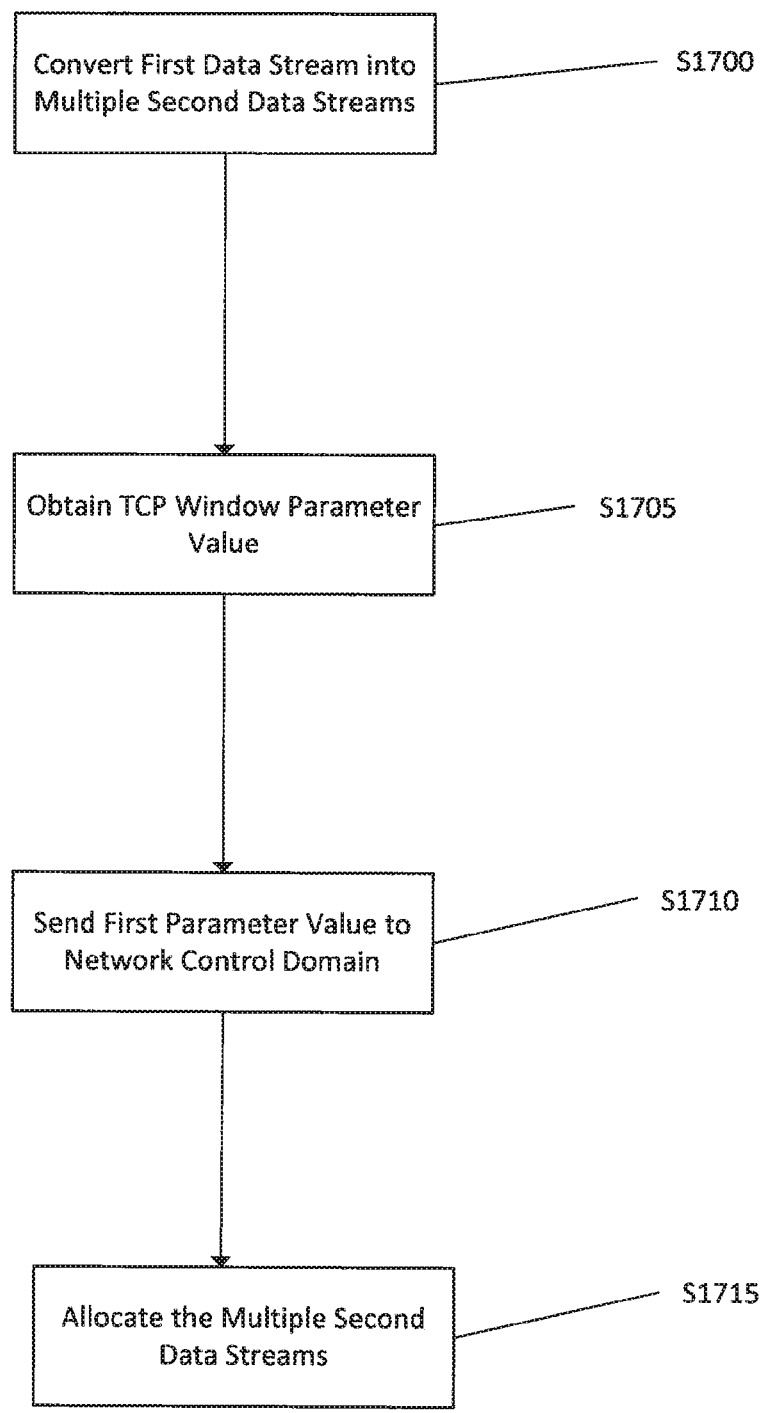

FIG. 17 illustrates a method according to an example embodiment. The description of FIG. 17 may be performed by a first network element, which may be the network proxy 450, the network proxy 550, the network proxy 650 or the network proxy 750. The network proxy 450, the network proxy 550, the network proxy 650 and the network proxy 750 are configured to perform the steps shown in FIG. 17 with the functionality described above. Thus, the structure illustrated in FIG. 2 causes the first network element to perform the method of FIG. 17.

At S1700, the first network element converts a first data stream into multiple second data streams over multiple data communication paths between the first network element and a user equipment (UE).

At S1705, the first network element obtains a Transmission Control Protocol (TCP) window parameter value for the multiple data communication paths in a user domain.

At S1710, the first network element sends a first parameter value to a network control domain of the first network element to limit a transmission rate of the multiple data communication paths if the TCP window parameter value exceeds the first parameter value.

At S1715, the first network element allocates the multiple second data streams to at least one of the multiple data communication paths based on the limited transmission rate. The first network element may transmit the allocated data streams over the at least one of the multiple data communication paths.

Embodiments provide multiple innovative features such as (i) deployment without the need to modify the UE operating system and covering also legacy user equipment, (ii) freedom to implement both (legacy) standardized and (optimized proprietary) non-standardized protocols for multi-path communications, and (iii) simple and reliable design based on standard operating system tools that are easy to maintain and update.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. A first network element comprising:
a non-transitory memory storing computer-readable instructions; and
at least one processor configured to execute the computer-readable instructions to cause the first network element to,
obtain user equipment side parameter values from a user domain of a user equipment, the user equipment side parameter values being at least one of values determined by the user equipment and values known by the user equipment, and the user equipment side parameter values including achievable data rate,
convert a first data stream received from a second network element into multiple second data streams over multiple data communication paths between the first network element and the user equipment, and
allocate the multiple second data streams to at least one of the multiple data communication paths based on the user equipment side parameter values.

2. The first network element of claim 1, wherein the at least one processor is configured to execute the computer-readable instructions to cause the first network element to obtain the user equipment side parameter values using control messages in a shared bandwidth as data payload.

3. The first network element of claim 1, wherein the at least one processor is configured to execute the computer-readable instructions to cause the first network element to obtain the user equipment side parameter values using one of a user datagram protocol and a transmission control protocol connection.

4. The first network element of claim 1, wherein the user equipment side parameter values include at least one of power-related information, congestion related information and delay related information and the at least one processor is configured to execute the computer-readable instructions to cause the first network element to,
allocate the multiple second data streams to the at least one of the multiple data communication paths based on the at least one of the power-related information, achievable data rate, congestion related information and delay related information.

5. The first network element of claim 4, wherein the at least one processor is configured to execute the computer-readable instructions to cause the first network element to allocate the multiple second data streams by changing a configuration of another one of the multiple data communication paths if the power-related information of the user equipment is below a threshold level.

6. The first network element of claim 4, wherein the at least one processor is configured to execute the computer-readable instructions to cause the first network element to allocate the multiple second data streams to the at least one of the multiple data communication paths further based on at least one of a transport protocol, an application and a quality of service class, the transport protocol being one of at least a first protocol and a second protocol, and the at least one processor is configured to cause the first network element to allocate the multiple second data streams differently for the first and second protocols.

7. The first network element of claim 1, wherein the at least one processor is configured to execute the computer-readable instructions to cause the first network element to select a scheduler based on the allocating the multiple second data streams to at least one of the multiple data communication paths.

8. The first network element of claim 1, wherein the at least one processor is configured to execute the computer-readable instructions to cause the first network element to,
obtain a transmission control protocol Transmission Control Protocol (TCP) congestion window parameter value for the at least one of the multiple data communication paths, and
send a first parameter value to a network control domain of the first network element to limit a downlink transmission rate if the transmission control protocol congestion window parameter value exceeds the first parameter value.

9. The first network element of claim 8, wherein the at least one processor is configured to execute the computer-readable instructions to cause the first network element to,
obtain a transmission control protocol receive window parameter value for the multiple data communication paths in the first network element, and
send a second parameter value to a network control domain of the user equipment to limit an uplink transmission rate if the transmission control protocol receive window parameter value exceeds the second parameter value.

10. The first network element of claim 1, wherein the at least one processor is configured to execute the computer-readable instructions to cause the first network element to,
establish a connection with a user space module in the user equipment, and
receive data from the user equipment using one of a user datagram protocol and a transmission control protocol connection based on the connection with the user space module.

11. A user equipment configured to receive and transmit data over communication paths of different bands, the user equipment comprising:
a non-transitory memory storing computer-readable instructions; and
at least one processor configured to execute the computer-readable instructions to cause the user equipment to,
operate in a network control domain and a user domain,
obtain user equipment side parameter values from the network control domain, the user equipment side parameter values being specific to a user application in the user domain, the user equipment side parameter values being at least one of values determined by the user equipment and values known by the user equipment, and the user equipment side parameter values including achievable data rate,
provide the user equipment side UE side parameter values to a network proxy from the user domain, and
receive data in the network control domain based on the user equipment side UE side parameter values.

12. The user equipment of claim 11, wherein the user equipment side parameter values include at least one of power-related information, congestion related information and delay related information.

13. The user equipment of claim 11, wherein the at least one processor is configured to execute the computer-readable instructions to cause the user equipment to provide the user equipment side parameter values using control messages in a shared bandwidth as data payload.

14. The user equipment of claim 11, wherein the at least one processor is configured to execute the computer-readable instructions to cause the user equipment to provide the user equipment side parameter values using one of a user datagram protocol and transmission control protocol connection.

15. A first network element comprising:
a non-transitory memory storing computer-readable instructions; and
at least one processor configured to execute the computer-readable instructions to cause the first network element to,
obtain user equipment side parameter values from a user domain of a user equipment, the user equipment side parameter values being at least one of values determined by the user equipment and values known by the user equipment, and the user equipment side parameter values including achievable data rate,
convert a first data stream received from a second network element into multiple second data streams over multiple data communication paths between the first network element and the user equipment, obtain a transmission control protocol window parameter value for the multiple data communication paths in a user domain,
send a first parameter value to a network control domain of the first network element to limit a transmission rate of the multiple data communication paths if the transmission control protocol window parameter value exceeds the first parameter value, and
allocate the multiple second data streams to at least one of the multiple data communication paths based on the limited transmission rate.

16. The first network element of claim 15, wherein the transmission control protocol window parameter value is a transmission control protocol congestion window parameter value and the at least one processor is configured to execute the computer-readable instructions to cause the first network element to,
limit a downlink transmission rate of the multiple data communication paths using the first parameter value, the limited downlink transmission rate being the limited transmission rate, and
allocate the multiple second data streams to at least one of the multiple data communication paths based on the limited downlink transmission rate.

17. The first network element of claim 16, wherein the at least one processor is configured to execute the computer-readable instructions to cause the first network element to,
obtain a transmission control protocol receive window parameter value for the multiple data communication paths, and
send a second parameter value to a network control domain of the user equipment to limit an uplink transmission rate if the transmission control protocol receive window parameter value exceeds the second parameter value.

18. The first network element of claim 15, wherein the user equipment side parameters are obtained using control messages in a shared bandwidth as data payload.

19. The first network element of claim 18, wherein the user equipment side parameter values include at least one of power-related information, congestion related information and delay related information and the at least one processor is configured to execute the computer-readable instructions to cause the first network element to,
allocate the multiple second data streams to the at least one of the multiple data communication paths based on the at least one of the power-related information, achievable data rate, congestion related information and delay related information.

20. The first network element of claim 19, wherein the at least one processor is configured to execute the computer-readable instructions to cause the first network element to allocate the multiple second data streams by changing a configuration of another one of the multiple data communication paths if the power-related information of the user equipment is below a threshold level.

21. A method comprising:
operating in a network control domain and a user domain;
obtaining user equipment side parameter values from the network control domain, the user equipment side parameter values being specific to a user application in the user domain, the user equipment side parameter values being at least one of values determined by a user equipment and values known by the user equipment, and the user equipment side parameter values including achievable data rate;
providing the user equipment side parameter values to a network proxy from the user domain; and receiving data in the network control domain based on the user equipment side parameter values.

* * * * *